United States Patent [19]
Togawa et al.

[11] Patent Number: 5,918,008
[45] Date of Patent: Jun. 29, 1999

[54] STORAGE DEVICE HAVING FUNCTION FOR COPING WITH COMPUTER VIRUS

[75] Inventors: Yoshifusa Togawa; Takayuki Miyamoto; Kuriko Nozawa, all of Kawasaki, Japan

[73] Assignee: Fujitsu Limited, Kawasaki, Japan

[21] Appl. No.: 08/656,908

[22] Filed: Jun. 3, 1996

[30] Foreign Application Priority Data

Jun. 2, 1995 [JP] Japan .................................. 7-136331

[51] Int. Cl.⁶ .................................................. G06F 11/00
[52] U.S. Cl. ..................................... 395/186; 395/183.14
[58] Field of Search .............................. 395/183.14, 186, 395/187.01, 188.01; 380/3, 4

[56] References Cited

U.S. PATENT DOCUMENTS 5,452,442 9/1995 Kephart .............................. 395/183.14

FOREIGN PATENT DOCUMENTS

| 62-224843 | 10/1987 | Japan . |
| 6-110718 | 4/1994 | Japan . |
| 6-168114 | 6/1994 | Japan . |
| 6-230959 | 8/1994 | Japan . |
| 6-242957 | 9/1994 | Japan . |
| 6-250861 | 9/1994 | Japan . |
| 8-016386 | 1/1996 | Japan . |

OTHER PUBLICATIONS

Peter Norton Symantec Corp., Norton Antivirus, 1992, Chapter 2, 3, 4, 6, B–4–B–7.

Primary Examiner—Robert W. Beausoliel, Jr.
Assistant Examiner—Pierre Eddy Elisca
Attorney, Agent, or Firm—Staas & Halsey

[57] ABSTRACT

A storage device, having the function of coping with a computer virus which has the ability to prevent infection with a computer virus and properly deal with infection with a computer virus, comprises: an infection management table used to manage files stored on a disk to see if the files are infected with viruses; a table registering unit for receiving a result of detection from a virus checker for detecting if a file stored on a disk is infected with a virus, and for registering the result in the infection management table; a judging unit that when a use request is made externally for a file stored on the disk, references the infection management table so as to judge if the file is infected with a virus; and a prohibiting unit that when the judging unit judges that a file is infected with a virus, prohibits the use of the file.

51 Claims, 28 Drawing Sheets

STORAGE DEVICE HAVING FUNCTION FOR COPING WITH COMPUTER VIRUS

BACKGROUND OF THE INVENTION

1. Field of the Invention

The present invention relates to a storage device having a function for coping with a computer virus that has the ability to prevent infection with a computer virus and to properly deal with infection with a computer virus.

In recent years, computer systems using computer programs have prevailed in enterprises, households, and the like. Accordingly, the number of occurrences of computer viruses that destroy or damage the computer systems and that have an auto-proliferation ability has tended to increase markedly.

In particular, recently-procurable personal computers are interconnected over a network such as a local area network (LAN) and adopt the configuration enabling information exchange through data communications. The fear that a computer virus (hereinafter abbreviated to a virus) residing in one personal computer spreads into the other personal computers connected over the network is becoming more and more serious.

This makes it necessary to construct a storage device having the ability to freely use files while preventing the breeding of a virus and to delete a file infected with a virus or restore the infected file into an uninfected state.

2. Description of the Related Art

For a clear understanding of problems concerning viruses destroying computer systems, infection with a virus in a typical storage device will be described with reference to FIG. 1.

A storage device 100 basically comprises, as shown in FIG. 1, a disk 105 for storing files, and a controller 120 for executing driving control for the disk 105 and also executing input/output control for a personal computer 110 that is connected to the drive.

The storage device 100 having the foregoing components is designed to be directly accessed by a driver under the control of an operating system in the personal computer 110 comprising a CPU 112 for processing various kinds of data, a RAM 114 for storing various kinds of data and programs, a ROM 116, and the like. In other words, the storage device yields such an environment in which; a file expanded in the personal computer 110, one running can readily destroy other files stored in the storage device.

On the other hand, a virus that intrudes from an external unit into a file via a LAN adapter 130, keyboard 140, display 150, or the like rewrites another file using a physical address of the file which is indicated by low-order address bits, or rewrites a system startup area such as a bootstrap using a physical address of the system startup area which is indicated by low-order address bits, and thus destroys an original program.

This poses a problem that files stored in a storage device are readily infected with a virus.

In an effort to cope with the above problem, a prior art system design is adopted such that if a virus checker (not shown) expanded in the personal computer 110 finds a file infected with a virus from among files expanded on the disk 105 in the storage device 100, all the files expanded on the disk are cleared and then originals of the files are installed again.

However, in the prior art, it is detected whether any of the files expanded on a disk in a storage device is infected with a virus. If any of the files is infected, the file is treated properly. The prior art does not adopt a method of actively preventing infection with a virus. There is therefore a problem that files expanded on the disk in the storage device are readily infected with a virus.

Moreover, in the prior art, when it is detected that any of files expanded on a disk in a storage device is infected with a virus, all the files expanded on the disk are cleared and then originals of the files are installed again. This poses a problem that a user is obliged to incur an enormous work load.

In the prior art, a file judged to be infected with a virus is cleared in its entirety. It cannot be analyzed as to what kind of virus destroyed the file. This poses a problem in that an anti-virus measure cannot be examined.

SUMMARY OF THE INVENTION

In view of the above-described problems, an object of the present invention is to provide a storage device having a function, for coping with a computer virus which has the ability to prevent infection with a virus and to properly deal with an infection of a virus.

To solve the above problems, a storage device having a function for coping with a computer virus in accordance with the present invention comprises: an infection management table means used to manage files stored on a disk and to see if the files are infected with a virus; a table registering means for receiving a result of detection from a virus checker for detecting if a file stored on the disk is infected with a virus, and for registering the result in the infection management table means; a judging means that when a use request is made externally for a file stored on the disk, references the infection management table means so as to judge if the file is infected with a virus; and a prohibiting means that when the judging means has judged that a file is infected with a virus, prohibits the use of the file.

In the storage device having the function of coping with a computer virus in accordance with the present invention, preferably, the virus checker is designed to be run by the storage device having a function for coping with a computer virus.

Furthermore, in the storage device having the function of coping with a computer virus in accordance with the present invention, the virus checker is designed to be activated at intervals of a specific cycle.

More preferably, in the storage device having the function of coping with a computer virus in accordance with the present invention, the virus checker is designed to be activated in response to a command instruction.

More preferably, in the storage device having the function of coping with a computer virus in accordance with the present invention, when a writing request is issued for a system startup area stored on a disk, the table registering means judges that a file which is stored on the disk and is a source of the writing request is infected with a virus and that registers the fact in the infection management table means.

More preferably, the storage device having the function of coping with a computer virus in accordance with the present invention includes an invalidating means that when a writing request is issued for the system startup area stored on the disk, invalidates the writing request.

More preferably, the storage device having the function of coping with a computer virus in accordance with the present invention includes a dedicated writing means for executing writing for the system startup area stored on the disk. When a writing request is issued for the system startup area stored on the disk, if the writing request specifies the use of the writing means, the invalidating means does not invalidate the writing request.

More preferably, in the storage device having the function of coping with a computer virus in accordance with the present invention, when a writing request is issued for an executable file stored on a disk, the table registering means judges that a file which is stored on the disk and is a source of the writing request is infected with a virus and registers the fact in the infection management table means.

More preferably, the storage device having the function of coping with a computer virus in accordance with the present invention includes a permitting means for determining whether a writing request made for a file that is registered as a virus-infected file by the table registering means and that is running should be permitted.

More preferably, in the storage device having the function of coping with a computer virus in accordance with the present invention, when a writing request is permitted by the permitting means, if a file that is a destination of the writing request is rewritten, the table registering means judges that the file which is the destination of the writing request is also infected with a virus and registers the fact in the infection management table means.

More preferably, in the storage device having the function of coping with a computer virus in accordance with the present invention, when the size of a file is varied by running the file, the table registering means judges that the file stored on the disk is infected with a virus and registers the fact in the infection management table means.

More particularly, in the storage device having the function of coping with a computer virus in accordance with the present invention, although a file stored on the disk is judged to be an executable file in terms of the file name, if the file is declared to be a data file, the table registering means judges that the file stored on the disk is infected with a virus and registers the fact in the infection management table means.

More preferably, the storage device having the function of coping with a computer virus in accordance with the present invention includes a determining means for determining through interactive processing whether the use of a virus-infected file that is registered in the infection management table means should be permitted. The prohibiting means does not prohibit the use of a file which is permitted by the determining means.

More preferably, the storage device having the function of coping with a computer virus in accordance with the present invention includes: a first managing means for managing original information of files stored on a disk; a second managing means for managing differential information brought about due to modification concerning the files stored on a disk, and history information concerning the differential information brought about due to modification; and a file registering means for merging the original information of a file which is managed by the first managing means and the differential information brought about due to modification which is managed by the second managing means so as to produce a file, and then registering the produced file on the disk.

More preferably, in the storage device having the function of coping with a computer virus in accordance with the present invention, the first managing means manages original information that is confirmed not to be infected with a virus by the virus checker, and the second managing means manages differential information brought about due to modification which is confirmed not to be infected with a virus by the virus checker.

More preferably, in the storage device having the function of coping with a computer virus in accordance with the present invention, as for a file which is stored on the disk, of which original information is not registered in the first managing means, and of which differential information brought about due to modification is not registered in the second managing means, the table registering means judges that the file stored on the disk is infected with a virus, and then registers the fact in the infection management table means.

More preferably, the storage device having the function of coping with a computer virus in accordance with the present invention includes a restoring means for deleting a virus-infected file that is registered in the infection management table means from the disk, activating the file registering means, thus restoring the file, and then registering the file on the disk.

More preferably, in the storage device having the function of coping with a computer virus in accordance with the present invention, the first managing means manages original information of the virus checker, and the second managing means manages differential information brought about due to modification concerning the virus checker and history information concerning the differential information brought about due to modification. The storage device includes a generating means for merging the original information of a virus checker which is managed by the first managing means with the differential information brought about due to modification concerning a virus checker which is managed by the second managing means so as to reproduce the virus checker.

More preferably, in the storage device having the function of coping with a computer virus in accordance with the present invention, the generating means generates a virus checker at the time of running a virus checker.

More preferably, in the storage device having the function of coping with a computer virus in accordance with the present invention, the first managing means encodes and manages original information, and the second managing means encodes and manages differential information brought about due to modification. The storage device includes a decoding means for decoding encoded data managed by the first and second managing means, and an encoding means for executing inverse conversion that is inverse to conversion performed by the decoding means.

More preferably, the storage device having the function of coping with a computer virus in accordance with the present invention includes a saving means for saving a virus-infected file that is registered in the infection management table means and virus information concerning the file in an inexecutable area, and a reading means for reading the information saved in the inexecutable area under the condition that permission information for permitting access to the inexecutable area is given.

In the storage device having the function of coping with a computer virus in accordance with the present invention, the table registering means registers a virus-infected file detected by the virus checker in the infection management table means.

Furthermore, when a writing request is issued for a system startup area stored on a disk, since a normal file will not issue such a writing request, the table registering means judges that a file which is a source of the writing request is infected with a virus, and registers the fact in the infection management table means. This is intended to treat new, malign, or unusual kinds of viruses that cannot be detected by the virus checker. At this time, when a writing request is issued, the invalidating means invalidates the writing request. When the writing means is included, if the writing request specifies the use of the writing means, the invalidating means does not invalidate the writing request.

Moreover, when a writing request is issued for an executable file stored on a disk, since a normal file will not issue such a writing request, the table registering means judges that a file which is a source of the writing request is infected with a virus and registers the fact in the infection management table means. The permitting means determines through interactive processing whether the writing request should be permitted. When the permitting means permits the writing request, since the file is rewritten, the table registering means judges that the file which is stored on the disk and is a destination of the writing request is also infected with the virus and registers the fact in the infection management table means.

When the size of a file is varied by running the file, the table registering means judges that the file stored on the disk is infected with a virus and registers the fact in the infection management table means.

Although a file stored on a disk is judged to be an executable file in terms of the file name, if the file is declared to be a data file, the table registering means judges that the file stored on the disk is infected with a virus and registers the fact in the infection management table means.

As for a file which is stored on a disk, of which original information is not registered in the first managing means, and of which differential information brought about due to modification is not registered in the second managing means, the table registering means judges that the file stored on the disk is infected with a virus and registers the fact in the infection management table means.

As mentioned above, when a virus-infected file is registered in the infection management table means, if a data processing unit makes a use request for the file stored on the disk, the judging means references the infection management table means so as to judge if the file for which the use request is made is infected with a virus. On receipt of a result of the judgment, the prohibiting means prohibits the use of the file that is judged to be infected with a virus. At this time, the prohibiting means does not prohibit the use of a file which is permitted by the determining means.

The saving means saves, that is, stores temporarily a virus-infected file whose use is prohibited and virus information concerning the file in the inexecutable area. The reading means reads the saved information from the inexecutable area and outputs it as information used for virus analysis under the condition that permission information for permitting access to the inexecutable area is given.

On the other hand, the restoring means deletes a virus-infected file, which is registered in the infection management table means, from the disk, activates the file registering means, thus restores the file, and then registers the restored file on a disk.

As mentioned above, the storage device having the function of coping with a computer virus in accordance with the present invention is designed to actively prevent infection with a virus, prohibits the use of a virus-infected file and restores the virus-infected file automatically, and preserves information concerning infection with viruses so that the information cannot be accessed readily. Consequently, a storage device capable of properly dealing with infection with a virus can be constructed.

BRIEF DESCRIPTION OF THE DRAWINGS

The above objects and features of the present invention will be more apparent from the following description of some preferred embodiments with reference to the accompanying drawings, wherein.

DESCRIPTION OF THE PREFERRED EMBODIMENTS

Hereinafter, the description of some preferred embodiments according to the present invention will be given with reference to the accompanying drawings.

Figure 1:
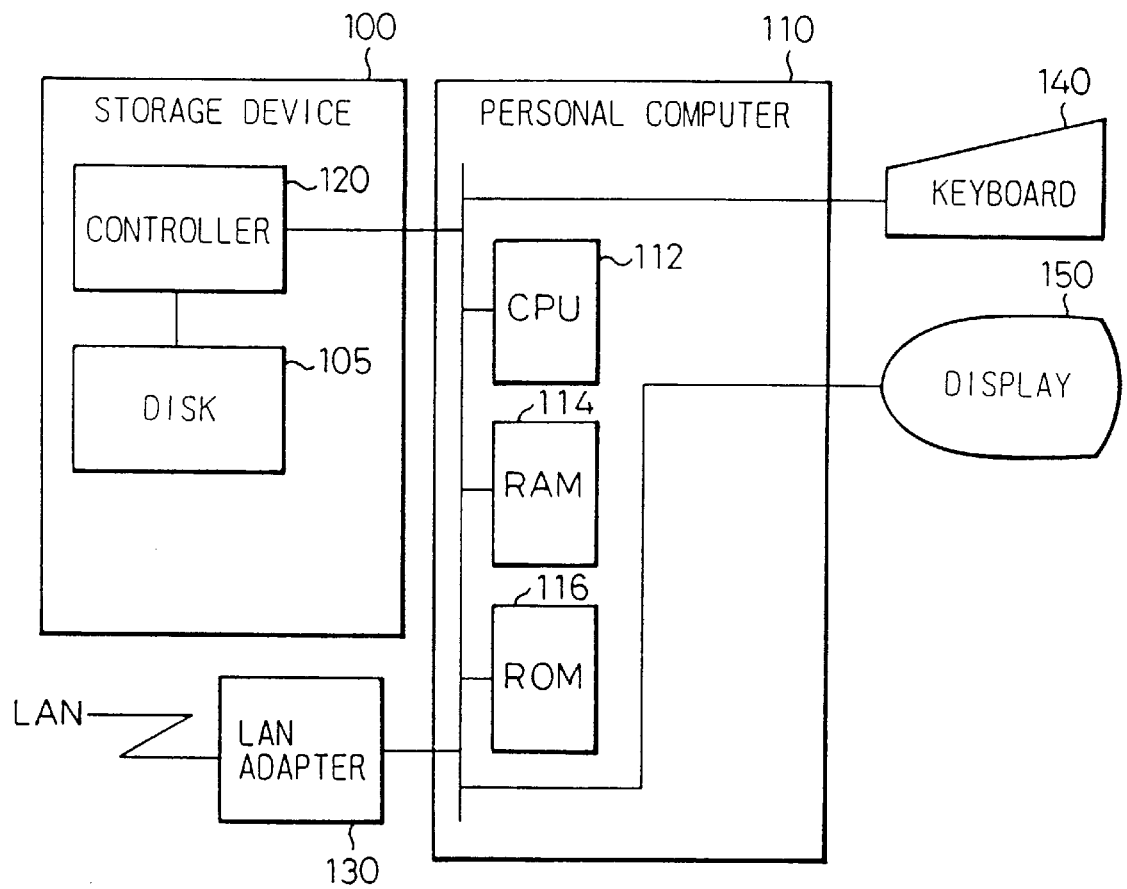
FIG. 1 (PRIOR ART) is a block diagram showing the configuration of a typical storage device.
Figure 2:
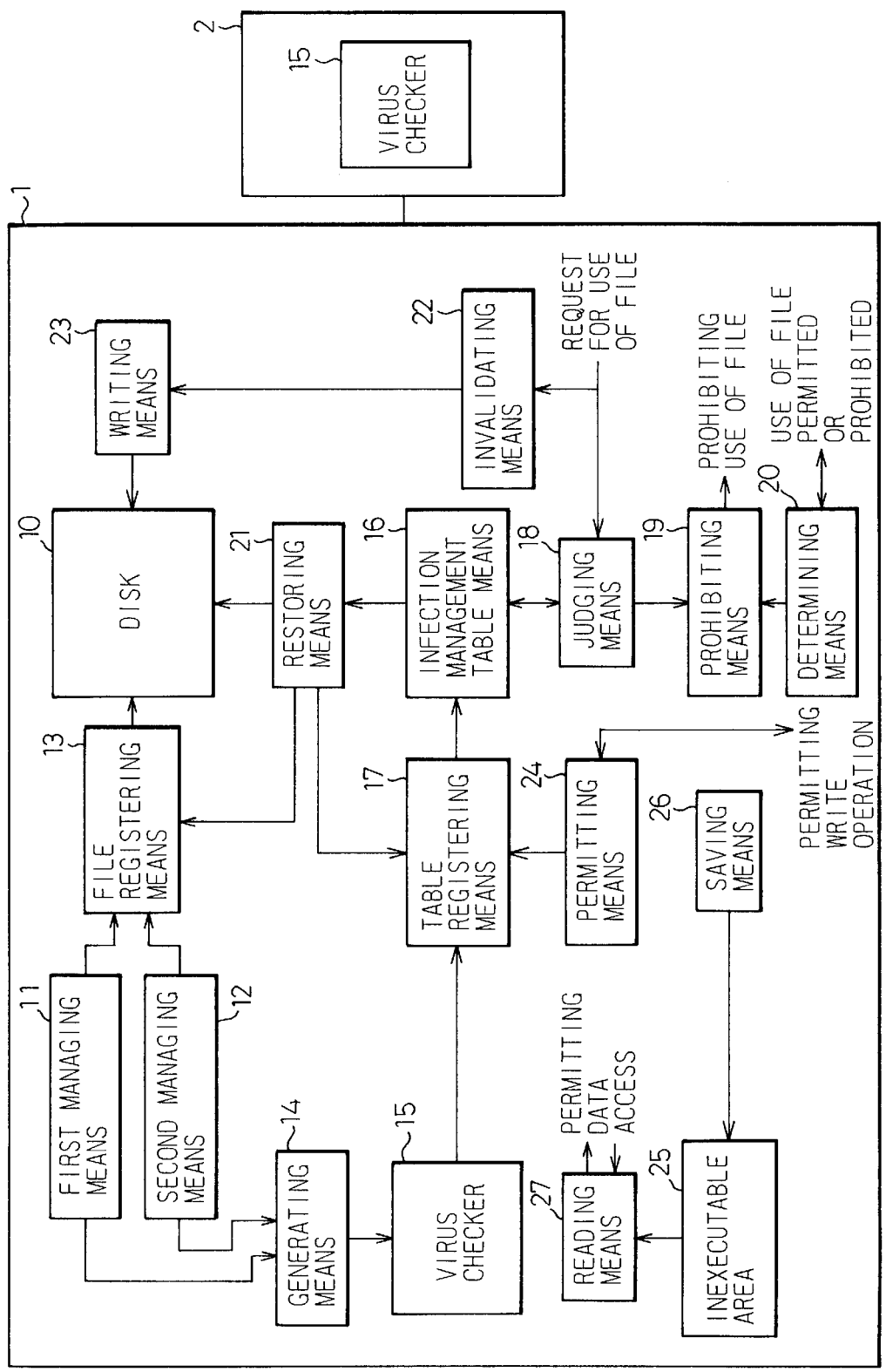
FIG. 2 is a block diagram showing the configuration of an embodiment based on the basic principles of the present invention.

FIG. 2 is a block diagram showing the configuration of an embodiment based on the basic principles of the present invention.

In the drawing, reference numeral 1 denotes a storage device having the function of coping with a computer virus in accordance with the present invention. Reference numeral 2 denotes a data processing unit for executing data processing using a file stored in the storage device 1 having the function of coping with a computer virus.

The storage device 1 having the function of coping with a computer virus comprises a disk 10, first managing means 11, second managing means 12, file registering means 13, generating means 14, virus checker 15, infection management table means 16, table registering means 17, judging means 18, prohibiting means 19, determining means 20, restoring means 21, invalidating means 22, writing means 23, permitting means 24, inexecutable area 25, saving means 26, and reading means 27. Herein, the virus checker 15 may be expanded in the data processing unit 2.

The disk 10 stores files. The first managing means 11 manages original information of the files stored on the disk 10 or manages original information of the virus checker 15. The second managing means 12 manages differential information brought about due to modification; that is, information concerning upgraded versions of the files stored on the disk, and history information concerning the differential information brought about due to modification, or manages differential information brought about due to modification concerning the virus checker 15; that is, information concerning an upgraded version of the virus checker 15, and history information concerning the differential information brought about due to modification.

The first managing means 11 may encode and manage the original information of the files and virus checker 15 so as to prevent the original information from being rewritten. The second managing means 12 may encode and manage the differential information brought about due to modification concerning the files and virus checker 15 so as to prevent the information from being rewritten. At this time, a decoding means for decoding the encoded data and an encoding means for executing inverse conversion that is inverse to conversion performed by the decoding means are included in the second managing means 12.

The file registering means 13 merges the original information of a file which is managed by the first managing means 11 with the differential information brought about due to modification concerning the file which is managed by the second managing means 12 so as to reproduce the file, and then stores the file on the disk 10. The generating means 14 merges the original information of the virus checker 15 which is managed by the first managing means 11 with the differential information brought about due to modification concerning the virus checker 15 which is managed by the second managing means 12 so as to reproduce the virus checker 15.

The virus checker 15 is activated at intervals of a specific period or activated in response to a command instruction, and detects whether a file stored on the disk 10 is infected with a virus. The infection management table means 16 is used to manage files stored on the disk and to see if the files are infected with viruses. The table registering means 17 registers data in the infection management table means 16. The judging means 18 references the infection management table means 16 in response to a use request made for a file stored on the disk 10 by the data processing unit 2, and judges if the file is infected with a virus. When the judging means 18 judges that a file is infected with a virus, the prohibiting means 19 prohibits the use of the file.

The determining means 20 determines through interactive processing whether the use of a file registered in the infection management table means 16 should be permitted. The restoring means 21 deletes a virus-infected file, which is registered in the infection management table means 16, from the disk 10, activates the file registering means 13, thus restores the file, and then registers the restored file on the disk 10. When a writing request is issued for a system startup area stored on the disk 10, the invalidating means 22 invalidates the writing request. The writing means 23 is prepared as a dedicated writing facility and executes writing for the system startup area stored on the disk 10.

The permitting means 24 determines through interactive processing whether a writing request made for an executable file stored on the disk should be permitted. The inexecutable area 25 is prepared as an area inaccessible with a normal access request. The saving means 26 saves a virus-infected file registered in the infection management table means 16 and virus information concerning the file in the inexecutable area 25. The reading means 27 reads information saved in the inexecutable area 25 under the condition that permission information for permitting access to the inexecutable area 25 is given.

In the embodiment of the present invention shown in FIG. 2, the table registering means 17 registers a virus-infected file detected by the virus checker 15 in the infection management table means 16.

Furthermore, when a writing request is issued for a system startup area stored on the disk 10, since a normal file will not issue such a writing request, the table registering means 17 judges that a file which is stored on the disk 10 and is a source of the writing request is infected with a virus, and registers the fact in the infection management table means 16. This is intended to treat new, malign, or unusual kinds of viruses that cannot be detected by the virus checker 15. When the writing request is issued, the invalidating means 22 invalidates the writing request. However, when the writing means 23 is included, if the writing request specifies the use of the writing means 23, the invalidating means 23 does not invalidate the writing request.

When a writing request is issued for an executable file stored on the disk 10, since a normal file will not issue such a writing request, the table registering means 17 judges that a file which is stored on the disk 10 and is a source of the writing request is infected with a virus, and registers the fact in the infection management table means 16. At this time, the permitting means 24 determines through interactive processing whether the writing request should be permitted. When the permitting means 24 permits the writing request, since the file is rewritten, the table registering means 17 judges that a file which is stored on the disk 10 and is a destination of the writing request is also infected with the virus, and registers the fact in the infection management table means 16.

Moreover, when the size of a file is varied by running the file, the table registering means 17 judges that the file stored on the disk 10 is infected with a virus, and registers the fact in the infection management table means 16.

Moreover, although a file stored on the disk is judged as an executable file in terms of the file name, if the file is declared to be a data file, the table registering means 17 judges that the file stored on the disk 10 is infected with a virus, and registers the fact in the infection management table means 16.

Moreover, as for a file which is stored on the disk 10, of which original information is not registered in the first managing means 11, and of which differential information brought about due to modification is not registered in the second managing means 12, the table registering means 17 judges that the file stored on the disk 10 is infected with a virus, and registers the fact in the infection management table means 16.

As mentioned above, when a virus-infected file is registered in the infection management table means 16, if the data processing unit 2 makes a use request for the file stored on the disk 10, the judging means 18 references the infection management table means 16 so as to judge if the file for which the use request is made is infected with a virus. On receipt of a result of the judgment, the prohibiting means 19 prohibits the use of the file that is judged to be infected with a virus by the judging means 18. At this time, the prohibiting means 19 does not prohibit the use of a file which is permitted by the determining means 20.

The saving means 26 saves the virus-infected file whose use is prohibited and virus information concerning the file in the inexecutable area 25 that cannot be accessed readily. The reading means 27 reads the saved information from the inexecutable area 25 under the condition that permission information for permitting access to the inexecutable area 25 is given, and outputs the read information as information used for virus analysis.

On the other hand, the restoring means 21 deletes a virus-infected file registered in the infection management table means 16 from the disk 10, activates the file registering means 13, thus restores the file, and registers the file on the disk 10.

As mentioned above, the storage device 1 having the function of coping with a computer virus shown in FIG. 2 is designed to actively prohibit infection with a virus, to prohibit the use of a file infected with a virus and restores the file automatically, and to preserve information concerning infection with viruses so that the information cannot be accessed readily. Thus, a storage device capable of properly dealing with infection with a virus can be constructed.

A storage device having the function of coping with a computer virus in accordance with the present invention will be described below in detail in conjunction with several preferred embodiments that are more practical than the basic embodiment shown in FIG. 2.

Figure 3:
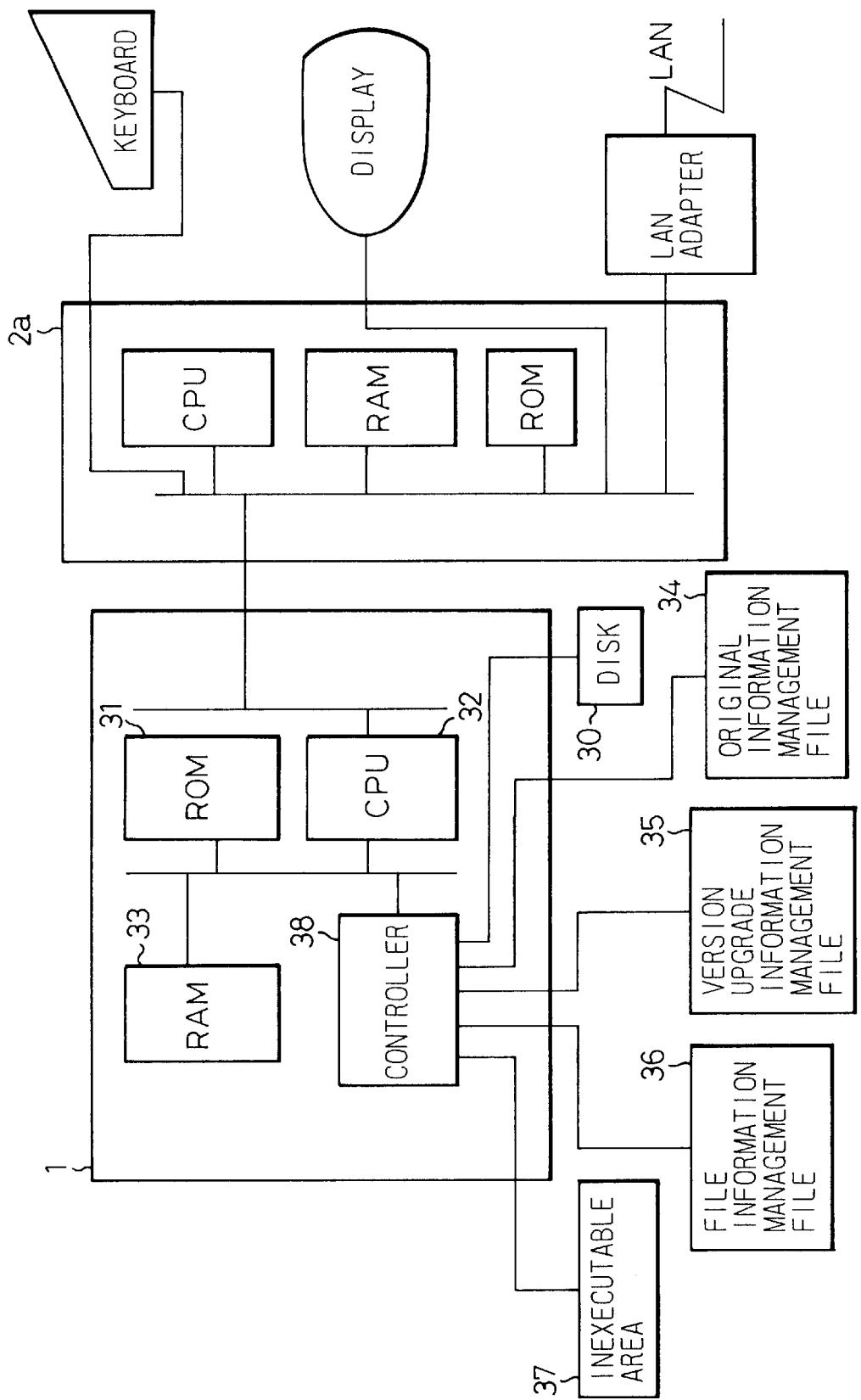
FIG. 3 is a block diagram showing the configuration of the first preferred embodiment of the present invention.

FIG. 3 shows the first preferred embodiment of the storage device 1 having the function of coping with a computer virus in accordance with the present invention.

The storage device 1 having the function of coping with a computer virus in this embodiment is connected to a personal computer 2a. The storage device 1 includes a disk 30 for storing files that are objects of access obtained by the personal computer 2a as well as a ROM 31 for storing firmware or the like that executes access processing or anti-virus processing, a CPU 32 for running firmware stored in the ROM 31 and executing data transfer to or from the personal computer 2a, and a RAM 33 prepared as a work area used by firmware that is run by the CPU 32, and thus has the capability of a CPU.

The storage device 1 further includes an original information management file 34 used to manage original information of files stored on the disk 30 and original information of a virus checker prepared for inspection of the files stored on the disk. A version update information management file 35 is used to manage differential information brought about due to modification concerning a file stored on the disk 30 and history information concerning the differential information brought about due to modification, and to manage differential information brought about due to modification concerning the virus checker and history information concerning the differential information brought about due to modification. A file information management file 36 is used to manage the information indicating if the files are stored on the disk, and is used to determine if the original information stored in the original information management file 34, and the differential information (brought about due to modification and which is stored in the version upgrade information management file 35) are infected with viruses. The information indicates if the files to be managed are executable files or data files, and if the files to be managed belong to a bootstrap or an initial program loader (IPL). An inexecutable area 37 which is prepared as an area that becomes accessible only when a password and ID number agree with internal data, and in which a file infected with a virus and virus information concerning the file are saved, has a data structure shown in FIG. 4. Herein, the reason why the version update information management file 35 manages history information is to make apparent which is the latest differential information brought about due to modification.

Figure 4:
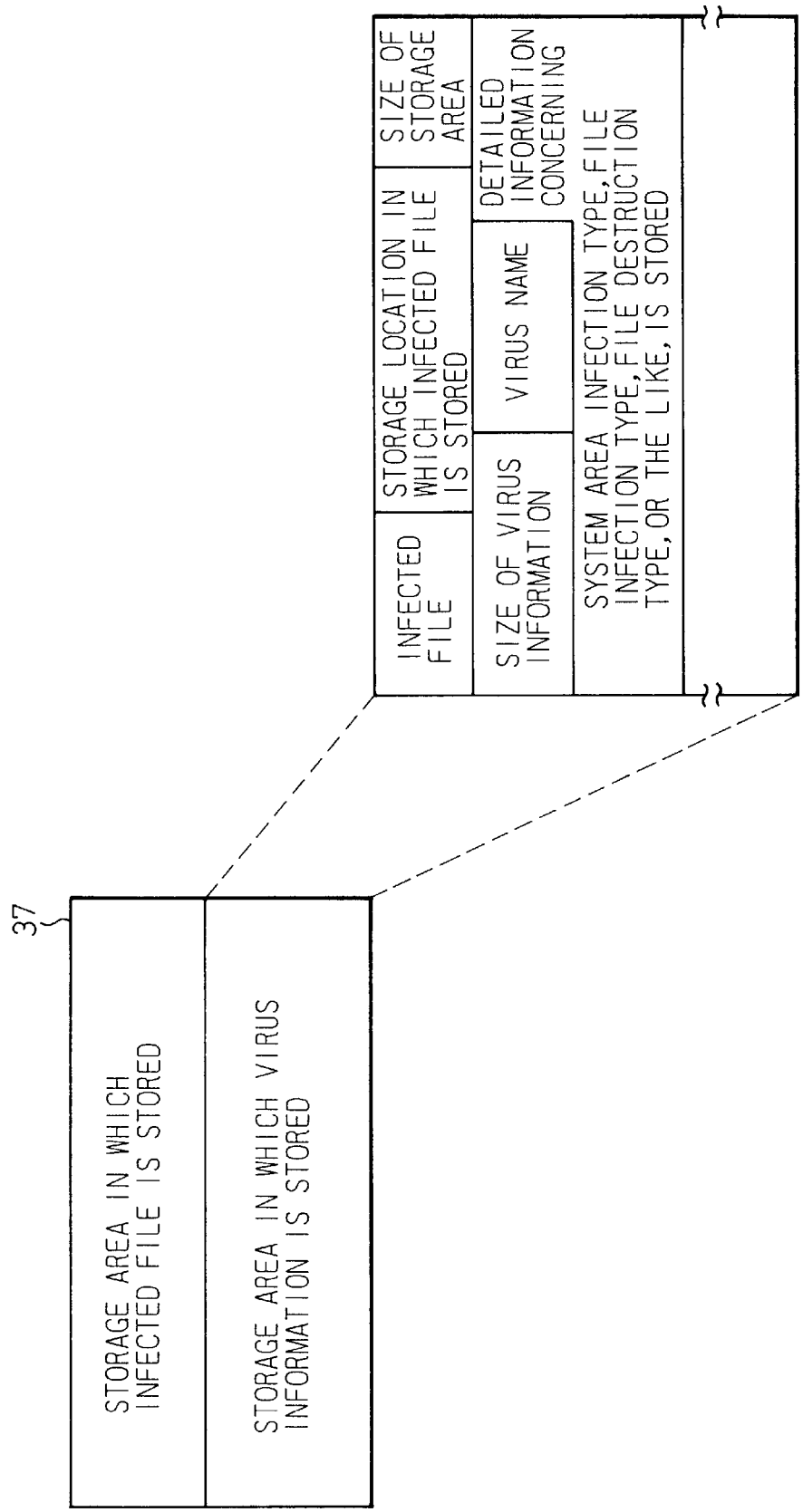
FIG. 4 is a block diagram showing the details of an inexecutable area in FIG. 3.

The inexecutable area 37 shown in FIG. 4 includes an infected-file storage area that is a storage area in which files infected with viruses are stored, and a virus information storage area that is a storage area in which virus information of the viruses is stored. Furthermore, the virus information storage area contains detailed information; such as, names of infected files that are infected with viruses, storage locations of the infected files, sizes of the storage locations of the infected files, sizes of virus information, name of viruses, and the information indicating if the viruses are of a system area infection type or a file infection type, and the information indicating if the viruses are of a file destruction type or the like.

Further included is a controller 38 for accessing a file stored on the disk, accessing original information managed in the original information management file 34, accessing the differential information brought about due to modification and history information which are managed in the version upgrade information management file 35, or accessing information saved in the inexecutable area 37.

Herein, the original information management file 34 and version upgrade information management file 35 are not designed to enable management of original information and differential information brought about due to modification from the viewpoint of a mere difference but may be designed to enable management of original information and differential information brought about due to modification on the basis of a relationship of succession including a parent-child relationship.

Figure 5:
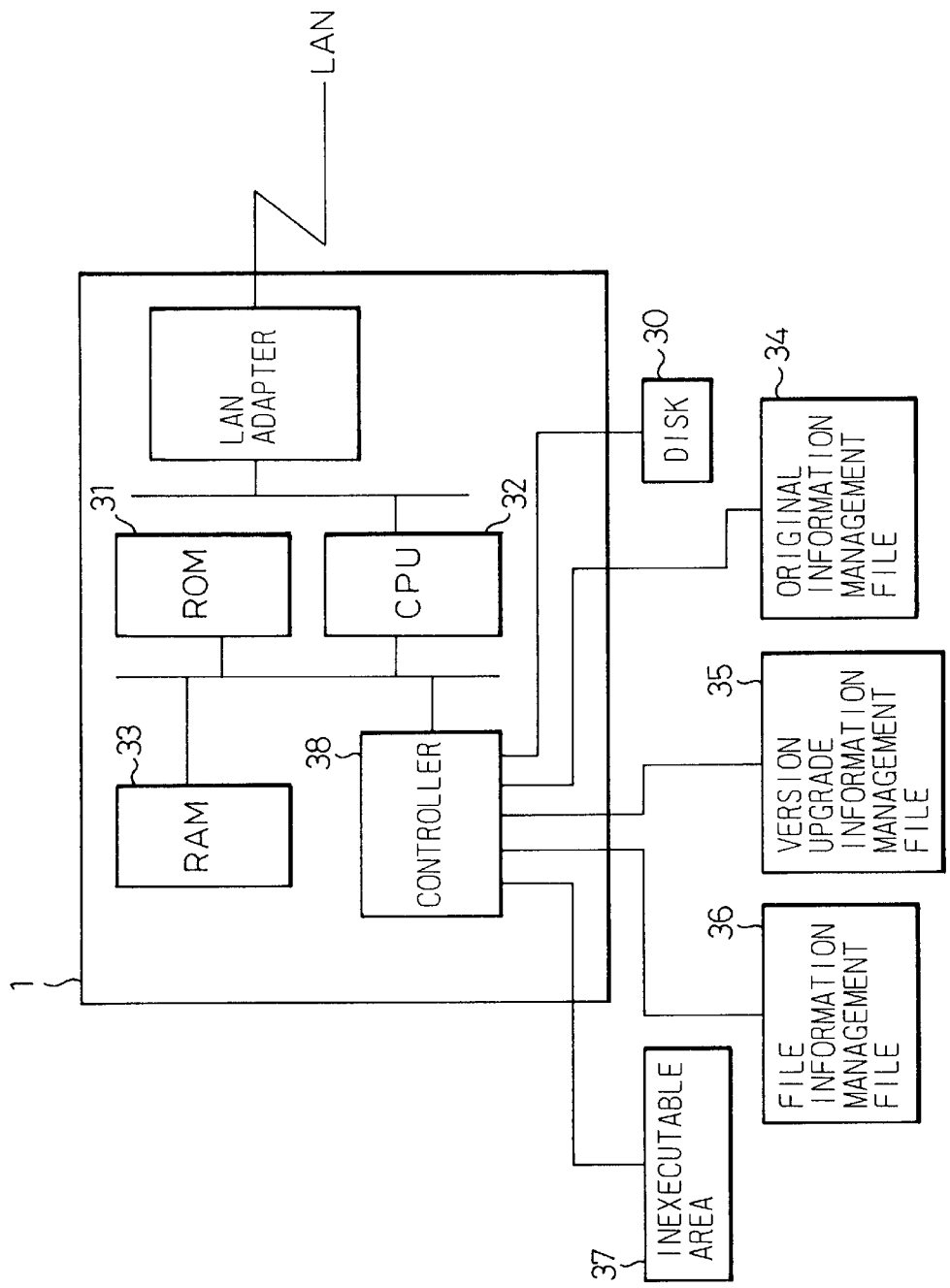
FIG. 5 is a block diagram showing the configuration of the second preferred embodiment of the present invention.
Figure 6:
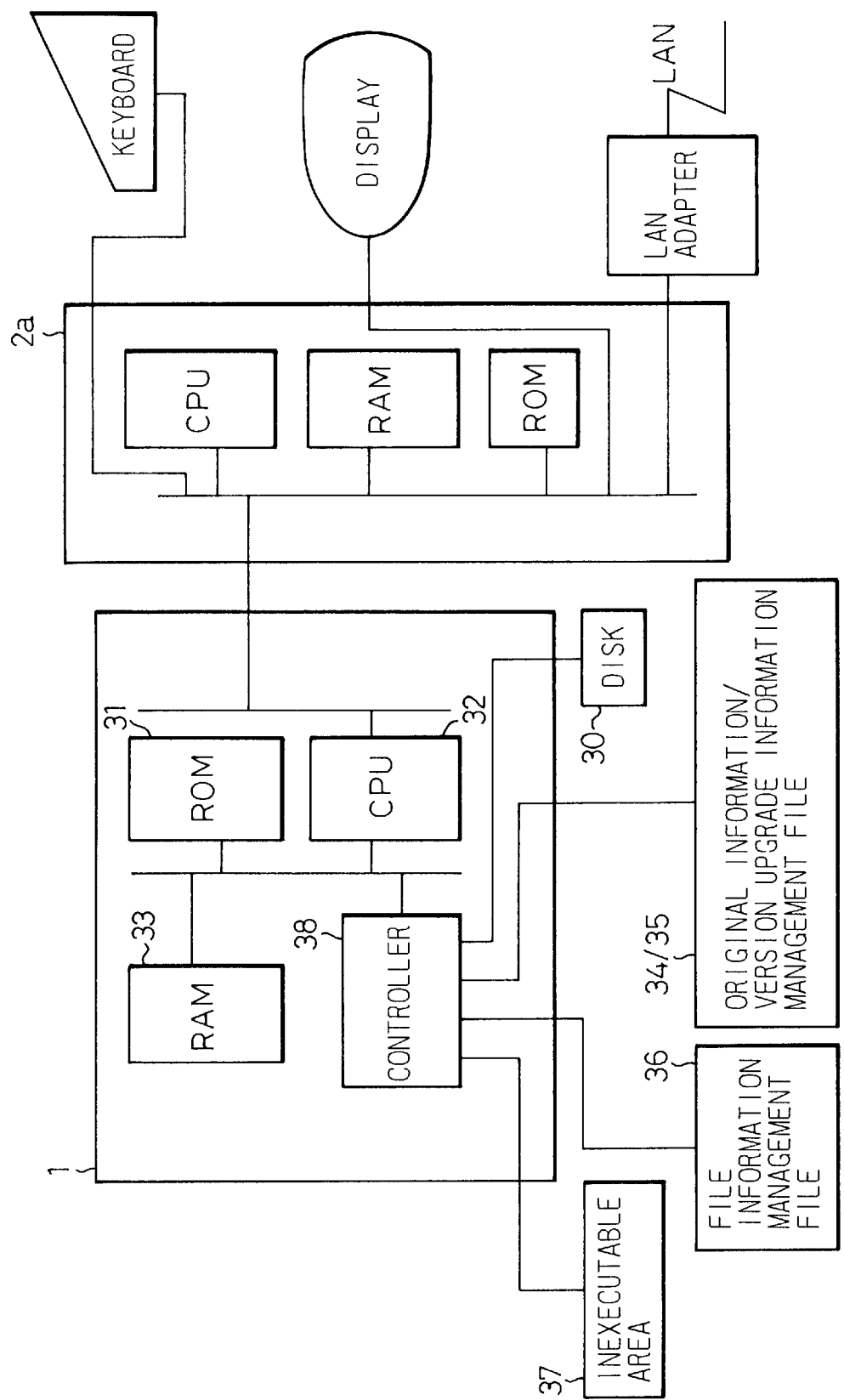
FIG. 6 is a block diagram showing the configuration of the third preferred embodiment of the present invention.
Figure 7:
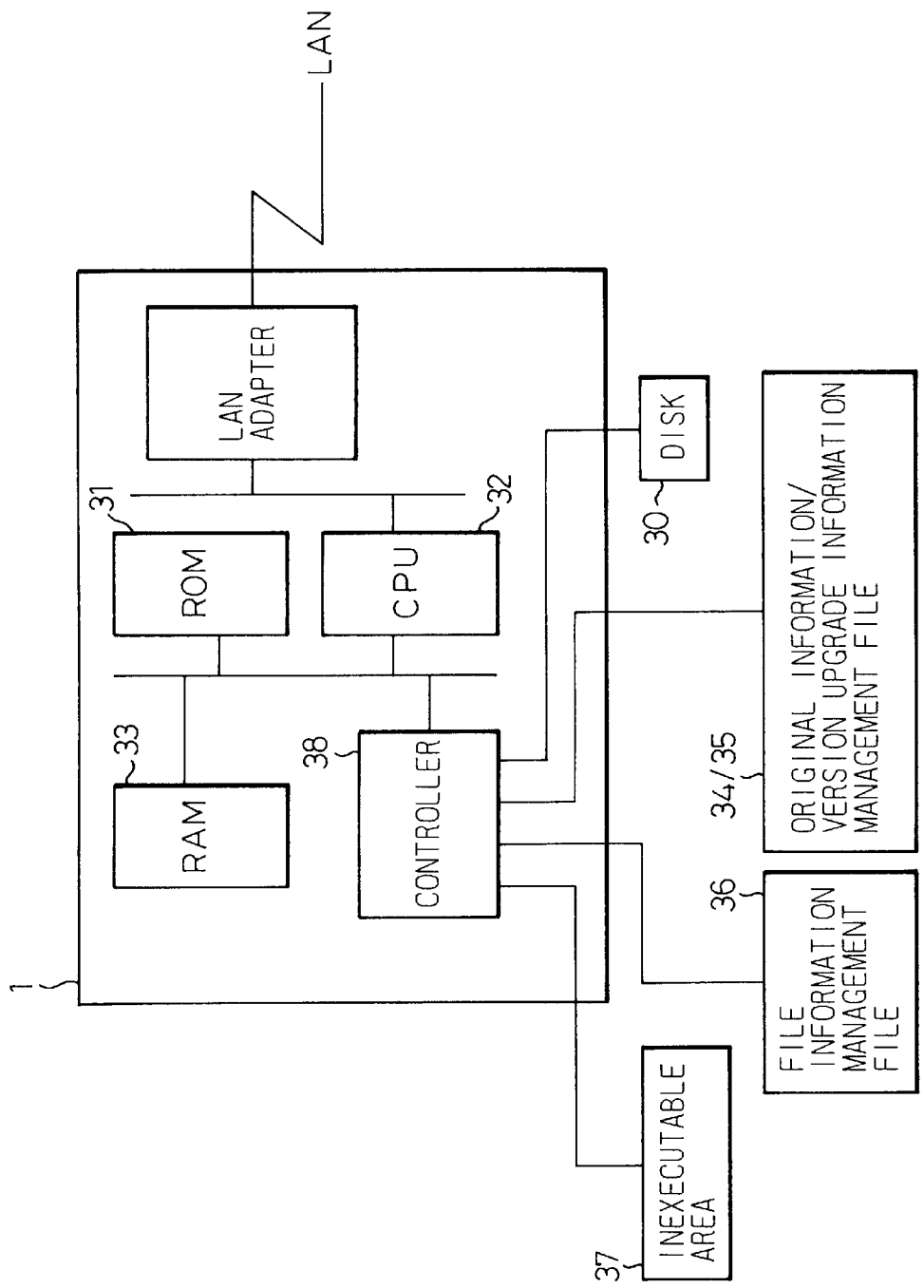
FIG. 7 is a block diagram showing the configuration of the fourth preferred embodiment of the present invention.
Figure 8:
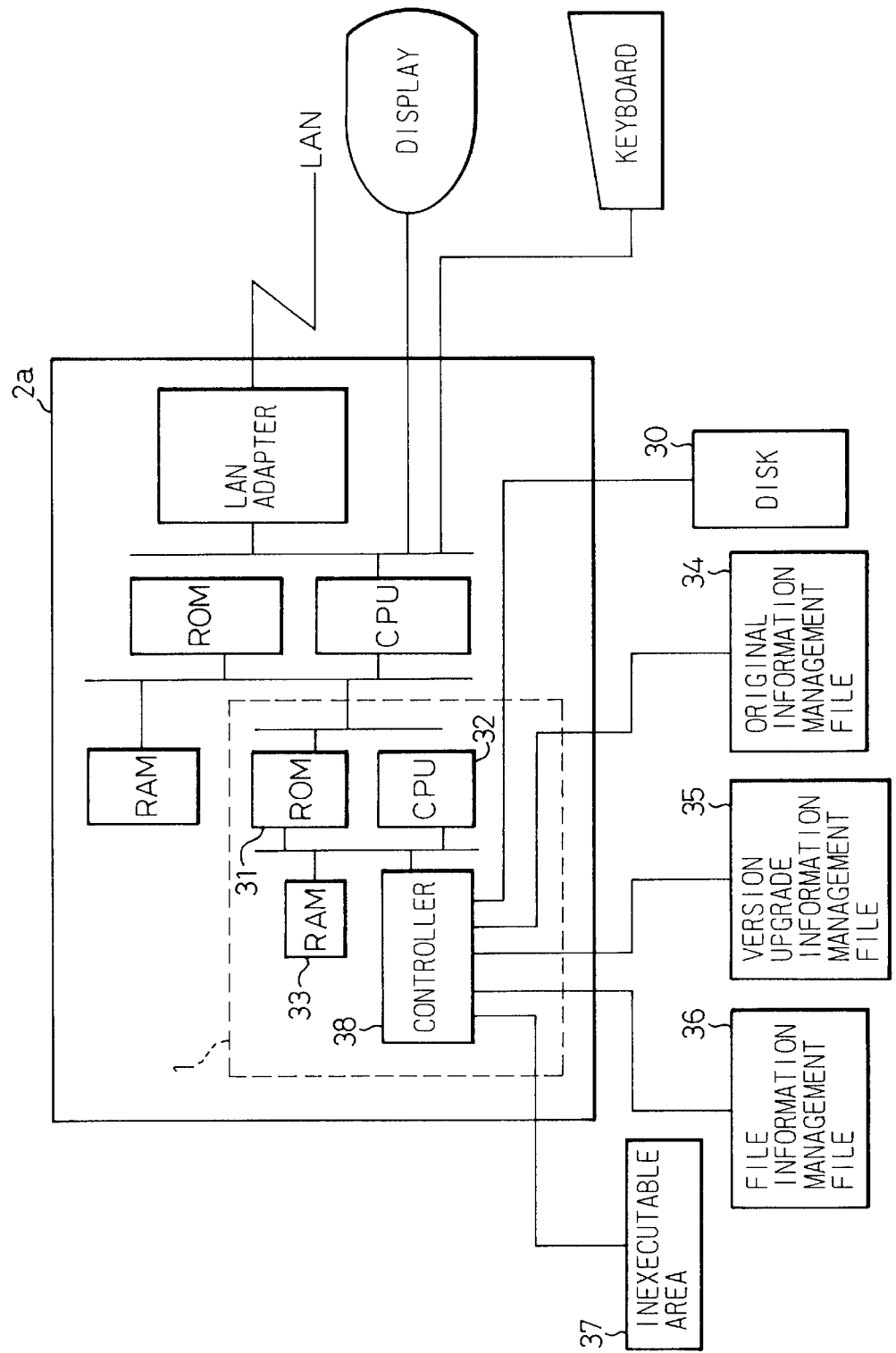
FIG. 8 is a block diagram showing the configuration of the fifth preferred embodiment of the present invention.
Figure 9:
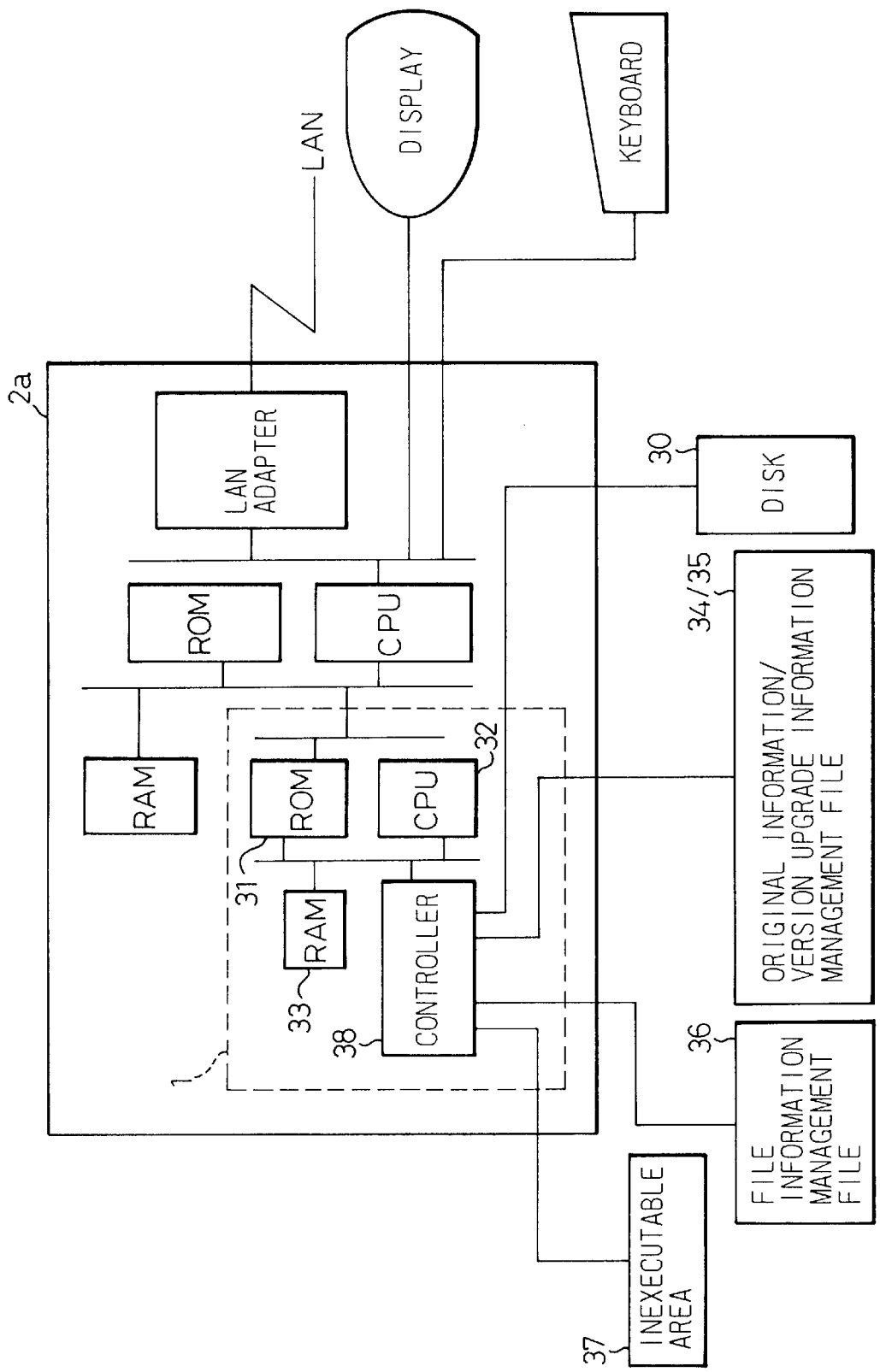
FIG. 9 is a block diagram showing the configuration of the sixth preferred embodiment of the present invention.

In the first preferred embodiment shown in FIG. 3, the storage device 1 having the function of coping with a computer virus is connected to the personal computer 2a. Aside from this, like the second preferred embodiment shown in FIG. 5, the storage device 1 may be connected over a LAN. In the embodiment shown in FIG. 3, the original information management file 34 and version upgrade information management file 35 are separate files. In the third preferred embodiment shown in FIG. 6 and the fourth preferred embodiment shown in FIG. 7, the original information management file and version upgrade information management file may be formed with one file. This kind of file is realized in the form of an original information/version upgrade information management file 34/35 shown in FIGS. 6 and 7. In the embodiment shown in FIG. 7, a personal computer and a storage device having the function of coping with a computer virus are united by combining the configurations shown in FIGS. 5 and 6. The embodiment shown in FIG. 3 has the configuration in which the storage device 1 having the function of coping with a computer virus is installed outside the personal computer 2a. Alternatively, like the fifth preferred embodiment shown in FIG. 8 and the sixth preferred embodiment shown in FIG. 9, the storage device may be installed inside the personal computer 2a. To be more specific, in the embodiment shown in FIG. 8, the original information management file 34 and version upgrade information management file 35 are separate files. In the embodiment shown in FIG. 9, both the files are formed with one file.

The storage device 1 having the function of coping with a computer virus in accordance with the present invention has, as mentioned above, the configuration including the original information management file 34 and version upgrade information management file 35.

The foregoing configuration is adopted for the following reasons: original information of a file stored on the disk 30 is stored in the original information management file 34; when the file is upgraded into a new version, differential information brought about due to modification concerning the upgraded version and history information concerning the differential information brought about due to modification are stored in the version upgrade information management file 35; and in case a file stored on the disk 30 is infected with a virus, the file can be restored by merging the original information of the file with differential information brought about due to modification. Moreover, since original information of a file and differential information brought about due to modification concerning the file are not expanded on the disk 30, it can be prevented that these kinds of information are infected with a virus.

A virus checker prepared for inspection of a file stored on a disk also has the possibility of being upgraded into a new version. The original information of the virus checker is stored in the original information management file 34. Differential information brought about due to modification concerning the upgraded version and history information concerning the differential information brought about due to modification are stored in the version upgrade information management file 35. Thus, the virus checker is managed.

Incidentally, when the original information management file 34 and version upgrade information management file 35 are constructed on the same medium, original information of files and a virus checker, differential information brought about due to modification concerning the files and virus checker, and history information concerning the differential information brought about due to modification can be managed totally. This is convenient in practice. In addition, the disk 30 and inexecutable area 37 may be constructed on the medium.

Original information of files and a virus checker which is stored in the original information management file 34, and differential information brought about due to modification concerning the files and virus checker and history information concerning the differential information brought about due to modification which are stored in the version upgrade information management file 35 must not be rewritten by the personal computer 2a.

Figure 10:
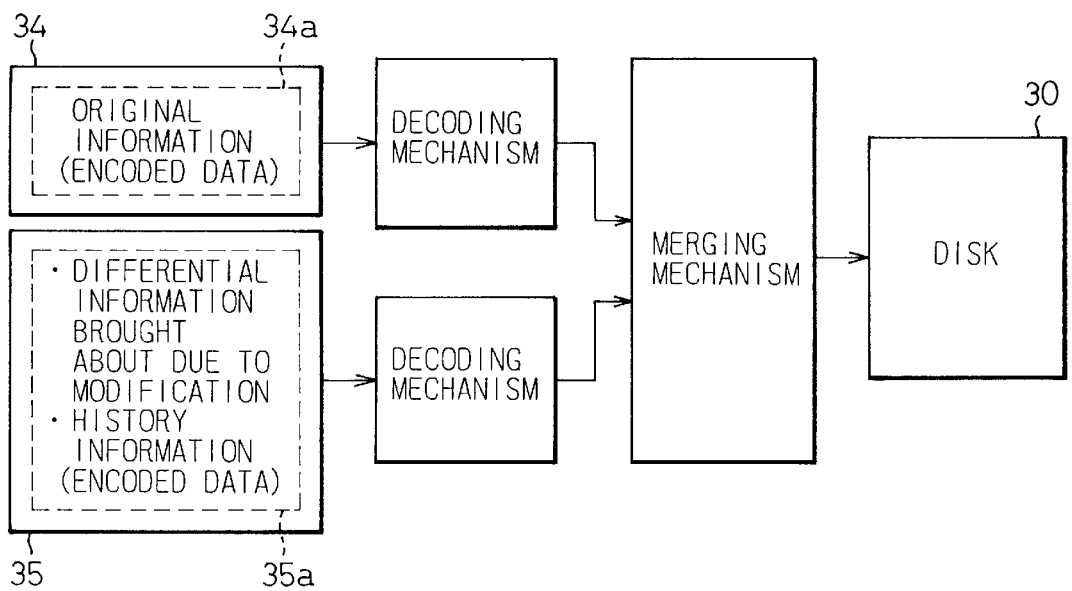
FIG. 10 is a block diagram for explaining a procedure of file production in accordance with the present invention.
Figure 11:
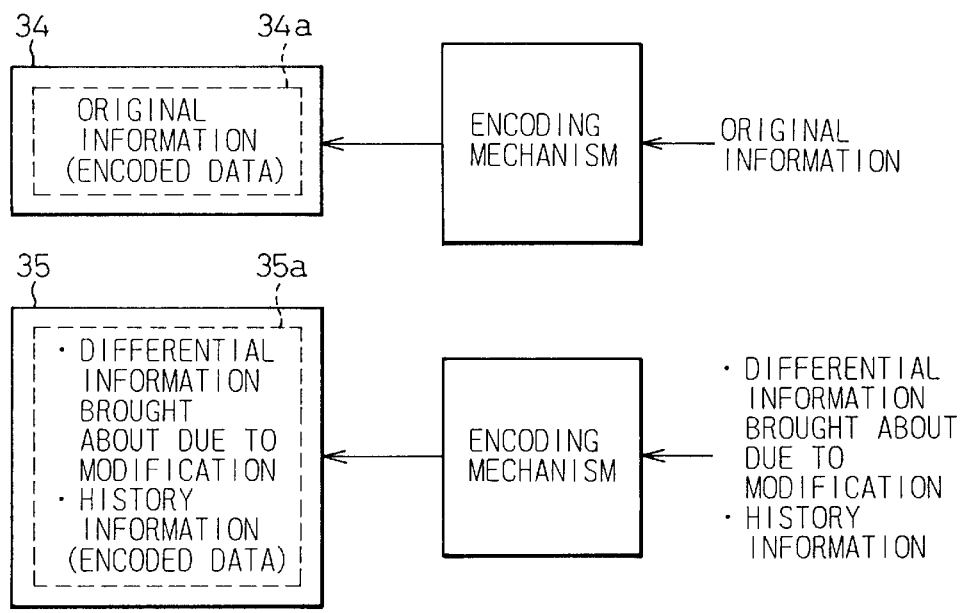
FIG. 11 is a block diagram for explaining a procedure of file storage in accordance with the present invention.

The storage device 1 having the function of coping with a computer virus has the configuration in which original information 34a of files and a virus checker which is stored in the original information management file 34, and differential information brought about due to modification concerning the files and virus checker and history information concerning the differential information brought about due to modification which are stored in the version upgrade information management file 35 are encoded, and in which a decoding mechanism for decoding encoded data is made ready. As shown in FIG. 10, the original information of a file or virus checker decoded by the decoding mechanism is merged with the differential information brought about due to modification concerning the file or virus checker which is decoded by the decoding mechanism in order to reproduce the file or virus checker. Moreover, an encoding mechanism for executing inverse conversion that is inverse to conversion performed by the decoding mechanism is made ready. As shown in FIG. 11, the original information of files and a virus checker which is encoded by the encoding mechanism is stored in the original information management file 34. The differential information brought about due to modification and history information 35a concerning the files and virus checker which are encoded by the encoding mechanism are stored in the version upgrade information management file 35.

Figure 12:
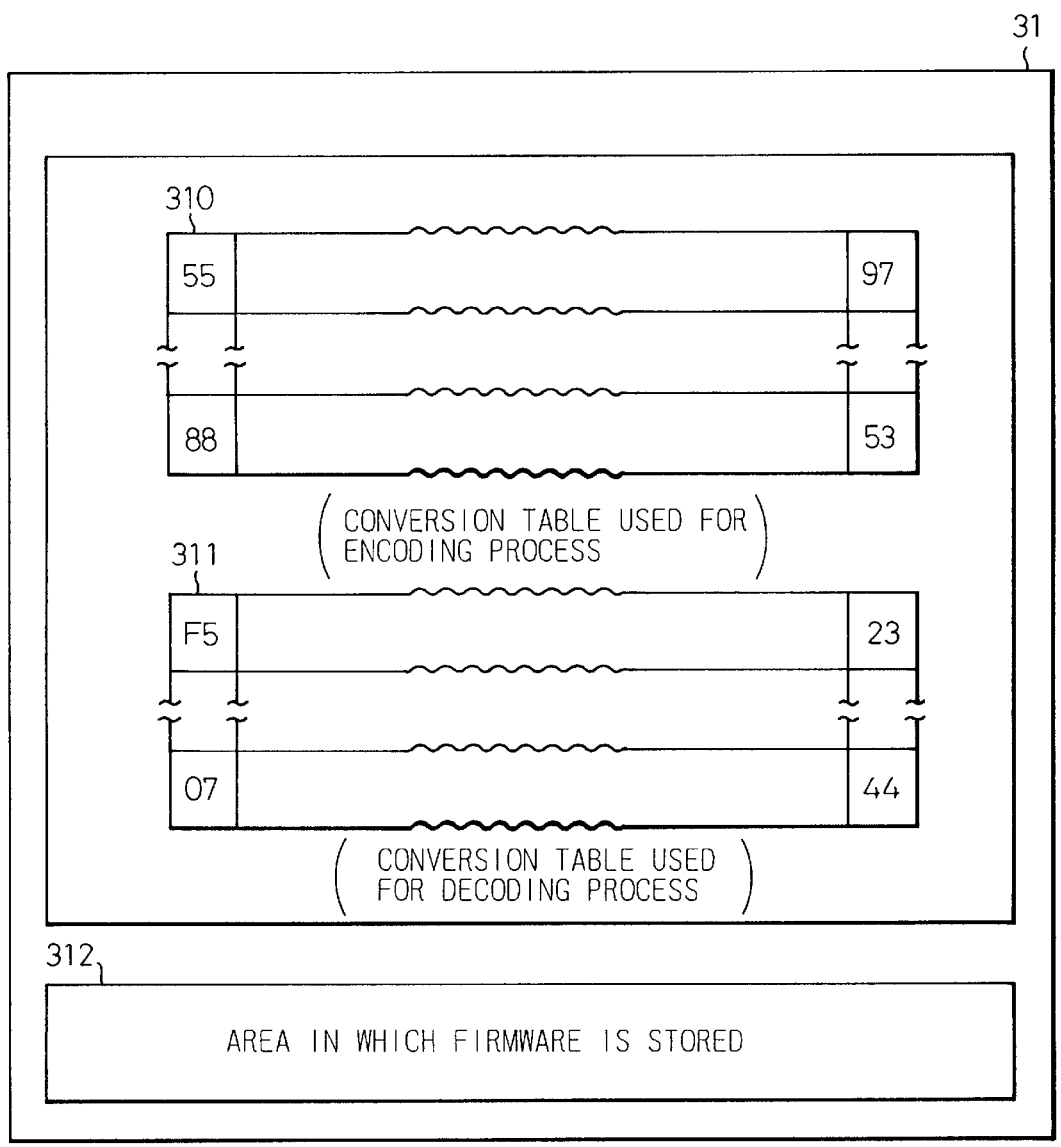
FIG. 12 is a block diagram showing the details of a conversion table in a ROM in accordance with the present invention.

More particularly, the encoding mechanism and decoding mechanism are realized by firmware stored in an area 312, which is reserved in order to store firmware, in the ROM 31 in the storage device 1 having the function of coping with a computer virus. For realizing the mechanisms, as shown in FIG. 12, a conversion table 310 is used to encode original information, differential information brought about due to modification, and history information, and a conversion table 311 is used to decode the original information, differential information brought about due to modification, and history information which are encoded are stored in the ROM 31.

Furthermore, the storage device 1 having the function of coping with a computer virus in accordance with the present invention includes the file information management file 36 as mentioned above.

The file information management file 36 manages the information indicating if files stored on the disk 30, original information stored in the original information management file 34, and differential information brought about due to modification which is stored in the version upgrade information management file 35 are infected with viruses, the information indicating if these files to be managed are executable files or data files, and the information indicating that the files to be managed belong to a bootstrap or an IPL.

Figure 13:
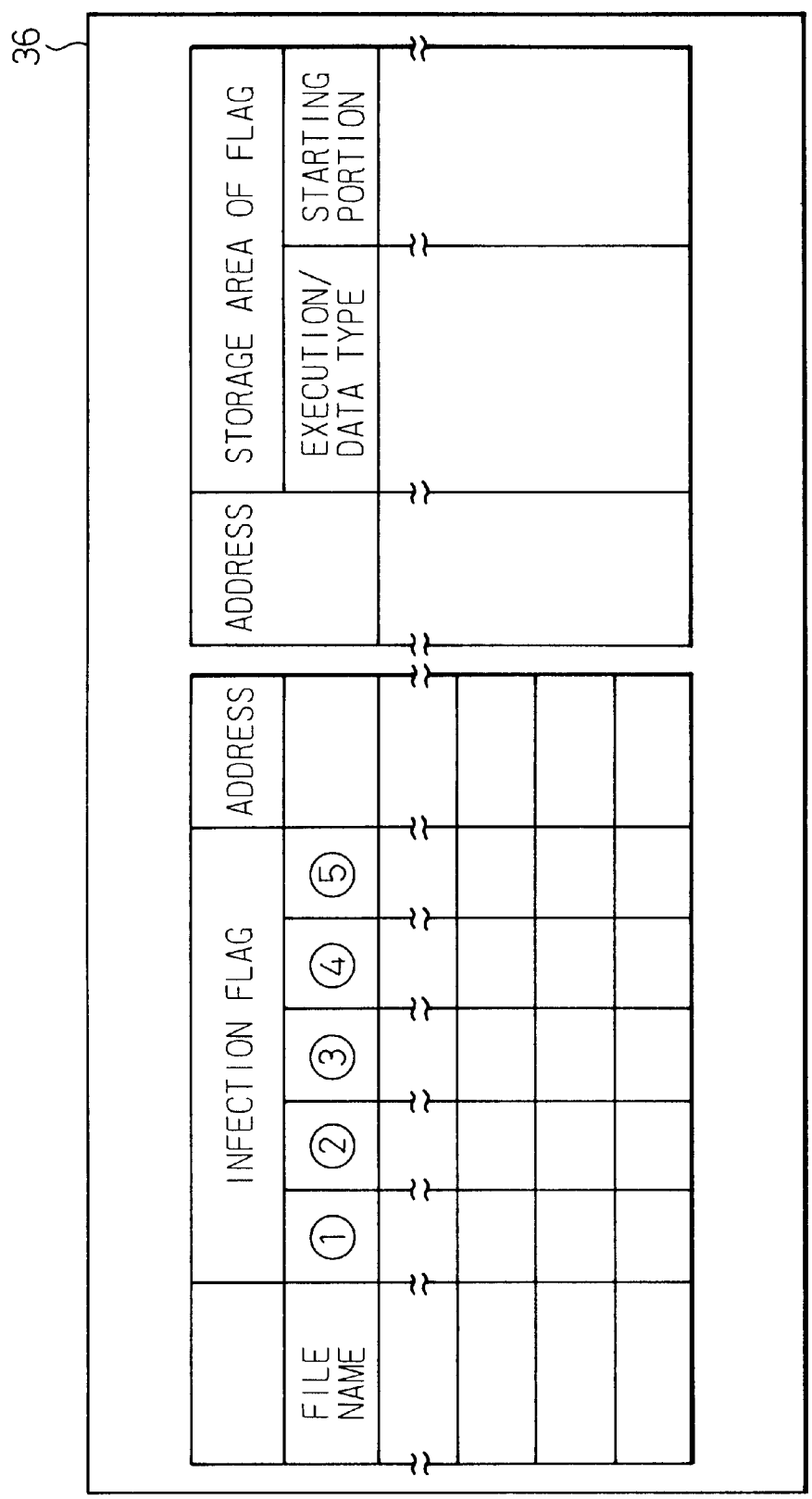
FIG. 13 is a block diagram showing an example of a data structure for a file information management file in accordance with the present invention.

FIG. 13 shows an example of a data structure for the file information management file 36. The example shown in FIG. 13 is devised on the assumption that a file which is stored on the disk and writes a bootstrap or an IPL is judged to be infected with a virus, and that a file which is stored on the disk and writes an executable file is judged to be infected with a virus. This is attributable to the fact that a normal file will not perform the former writing and will not in general perform the latter writing, either.

Specifically, the file information management file 36 manages, as shown in FIG. 13, file names of files to be managed, addresses of the files, execution/data type flags indicating whether the files are executable files or data files, and starting portion flags indicating if the files belong to a bootstrap or an IPL. File information management file 36 also manages: infection flags <1> indicating if it is detected by a virus checker that the files are infected with viruses, infection flags <2> indicating if it is judged according to whether or not writing the bootstrap or IPL is attempted that the files are infected with viruses, infection flags <3> indicating if it is judged according to whether or not writing an executable file is attempted that the files are infected with a virus, infection flags <4> indicating if original information stored in the original information management file 34 is infected with a virus, and infection flags <5> indicating if differential information brought about due to modification which is stored in the version upgrade information management file 35 is infected with a virus. Thus, the aforesaid information is managed. Whether or not original information stored in the original information management file 34 is infected with a virus and whether or not differential information brought about due to modification which is stored in the version upgrade information management file 35 is infected with a virus is judged by the virus checker or according to whether writing the bootstrap, the IPL, or an executable file is attempted.

Herein, in the storage area of an execution/date type flag, "1" is set relative to an executable file and "0" is set relative to a data file. In the storage area of a starting portion flag, "1" is set in case a file belongs to a bootstrap or IPL, and "0" is set in any other case. In the storage area of infection flag <1> or <2>, "1" is set when infection with a virus is detected, and "0" is set when infection with a virus it not detected. In the storage area of infection flag <3>, "1" is set when infection with a virus is suspected, and "0" is set when infection with a virus is not suspected. In the storage area of infection flag <4> or <5>, "1" is set when infection with a virus is suspected, and "0" is set when infection with a virus is neither detected nor suspected.

FIGS. 14 to 23 describe some examples of processing flows executed by the storage device 1 having the function of coping with a computer virus which is configured as mentioned above. Next, operations performed by the storage device 1 having the function of coping with a computer virus in accordance with the present invention will be described in detail in conjunction with these examples of processing flows.

When activated, the storage device 1 having the function of coping with a computer virus initializes the infected-file storage area and virus information storage area (storage areas shown in FIG. 4) within the inexecutable area 37 (step S141). Thereafter, initialization is executed by registering an ID number and password needed to access the inexecutable area 37 (step S142).

On the other hand, for registering original information of a purchased file in the original information management file 34 or registering differential information brought about due to modification concerning the file in the version upgrade information management file 35, the storage device 1 having the function of coping with a computer virus merges original information of a virus checker which is stored in the original information management file 34 with the latest differential information brought about due to modification concerning the virus checker which is stored in the version upgrade information management file 35. Thus, the virus checker is reproduced and expanded in the RAM 33.

Figure 15:
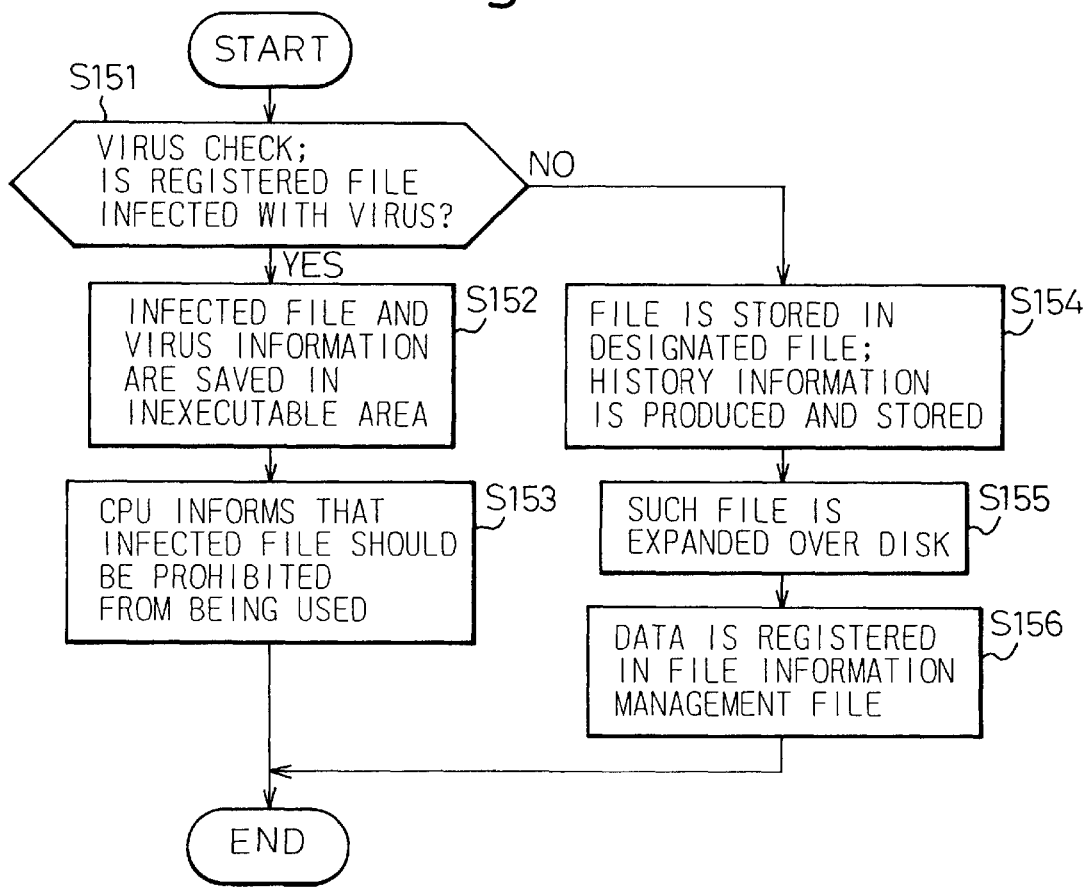
FIG. 15 is a flowchart for explaining the second example of a processing flow to be executed by an embodiment of the present invention.

As shown in the second example of a processing flow in FIG. 15, the reproduced virus checker is used to check if a file registered (original information and differential information brought about due to modification) is infected with a virus (step S151). If it is judged that the file is infected with a virus, the infected file and virus information concerning the file are saved in the inexecutable area 37 (step S152). Use Prohibited Due To Infection With a Virus is reported to the personal computer 2a that is a source of registration (step S153).

By contrast, when it is judged that a file is not infected with a virus, the file is stored in the original information management file 34 and version upgrade information management file 35 which are destinations of registration. History information is created and stored in the version upgrade information management file 35 (step S154). The file (when a registered file contains differential information brought about due to modification, the file is a file created by merging the information with original information) is then expanded on the disk 30. At the same time, data is registered in the file information management file 36 (step S155).

As mentioned above, original information of a file which is not infected with a virus is registered in the original information management file 34. Differential information brought about due to modification concerning the file which is not infected with a virus is registered in the version upgrade information management file 35. A file that contains the original information merged with the differential information brought about due to modification and that is not infected with a virus is then expanded on the disk 30. Herein, the reason why the system is designed so that a virus checker is not stored on the disk 30 in advance but produced prior to checking on infection with a virus is to prevent the virus checker itself from being infected with a virus.

In the second example of a processing flow in FIG. 15, it is confirmed that original information of a file registered in the original information management file 34 is not infected with a virus, and it is also confirmed that differential information brought about due to modification concerning the file registered in the version upgrade information management file 35 is not infected with a virus. A file that is expanded on the disk 30 by merging original information with differential information brought about due to modification is checked by processing that will be described later in order to see if the file is infected with a virus. The confirmation is therefore not absolutely needed. In the description of the second example of a processing flow in FIG. 15, the storage device 1 having the function of coping with a computer virus actuates a virus checker. Alternatively, the system may be designed so that the personal computer 2a actuates the virus checker.

As mentioned above, in this embodiment of the present invention, it is judged that a file being stored on the disk 30 and attempting to write a bootstrap or an IPL is infected with a virus. This is attributable to the fact that a normal file will not perform such writing.

As described later, since the present invention adopts the system design of prohibiting a file infected with a virus from running, a file attempting to write a bootstrap or IPL is prohibited from running. This means that the bootstrap or IPL cannot be registered. In the present invention, therefore, when a specific command instructing registration of the bootstrap or IPL is issued, the registration is permitted.

Figure 16:
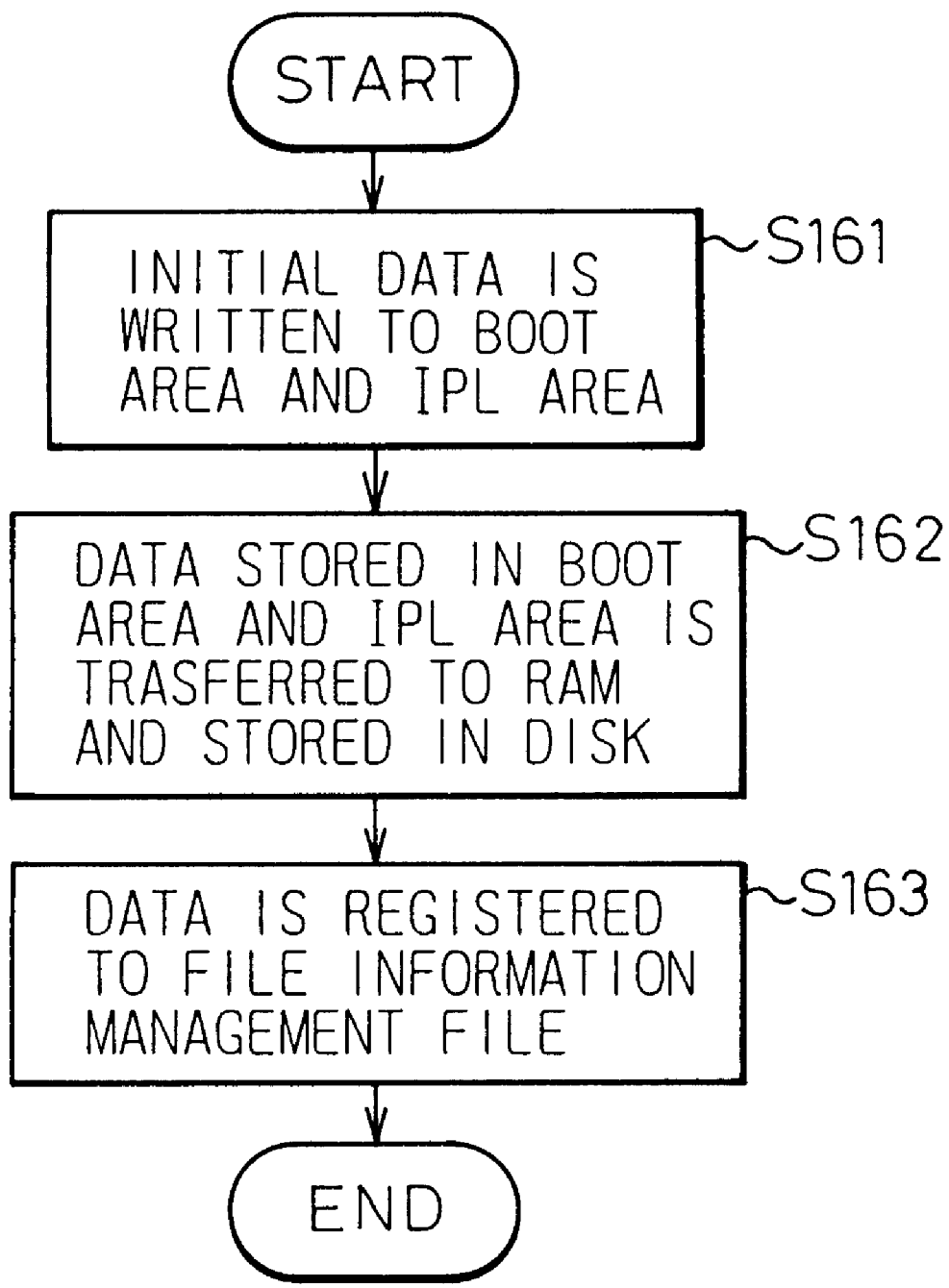
FIG. 16 is a flowchart for explaining the third example of a processing flow to be executed by an embodiment of the present invention.

As shown in the third example of a processing flow in FIG. 16, when a specific command instructing registration of a bootstrap of IPL is issued, the storage device 1 having the function of coping with a computer virus registers the bootstrap or IPL, for which a registration request has been made, in the original information management file 34 (step S161), and fetches the bootstrap or IPL into the RAM 33 and stores it on the disk 30 (step S162). Along with storage on the disk 30, "1" is set in the storage area of a starting portion flag in the file information management file 36. It is thus registered that a file stored is a bootstrap or IPL. "1" is set in the storage area of an execution/data type flag, whereby it is registered that the file stored is an executable file. Infection flags <1> to <5> are set to "0," whereby it is registered that the file stored is not infected with a virus (step S163).

Figure 17:
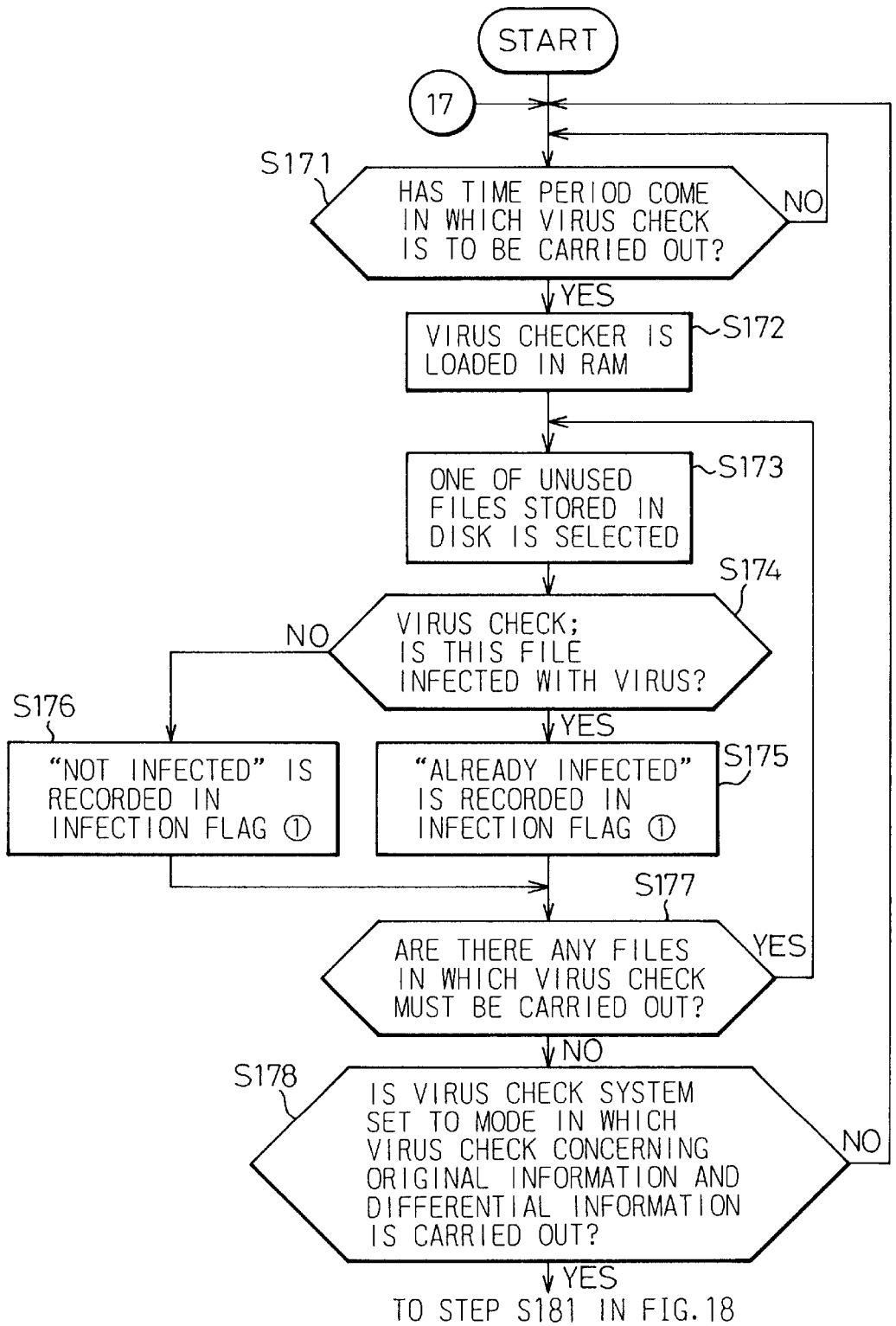
FIG. 17 is a flowchart for explaining the fourth example of a processing flow to be executed by an embodiment of the present invention.
Figure 18:
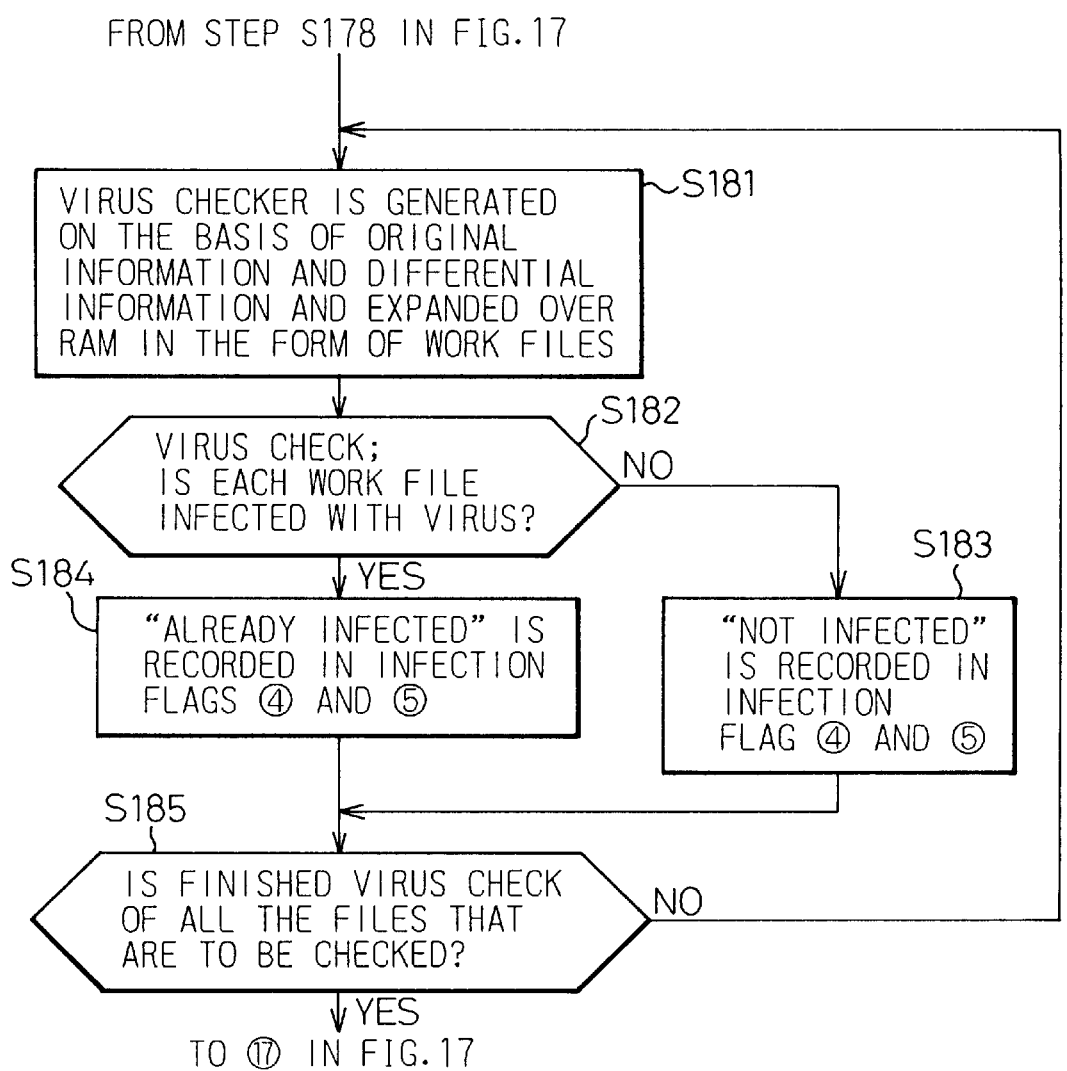
FIG. 18 is a flowchart for explaining the fourth example of a processing flow to be executed by an embodiment of the present invention.
Figure 19:
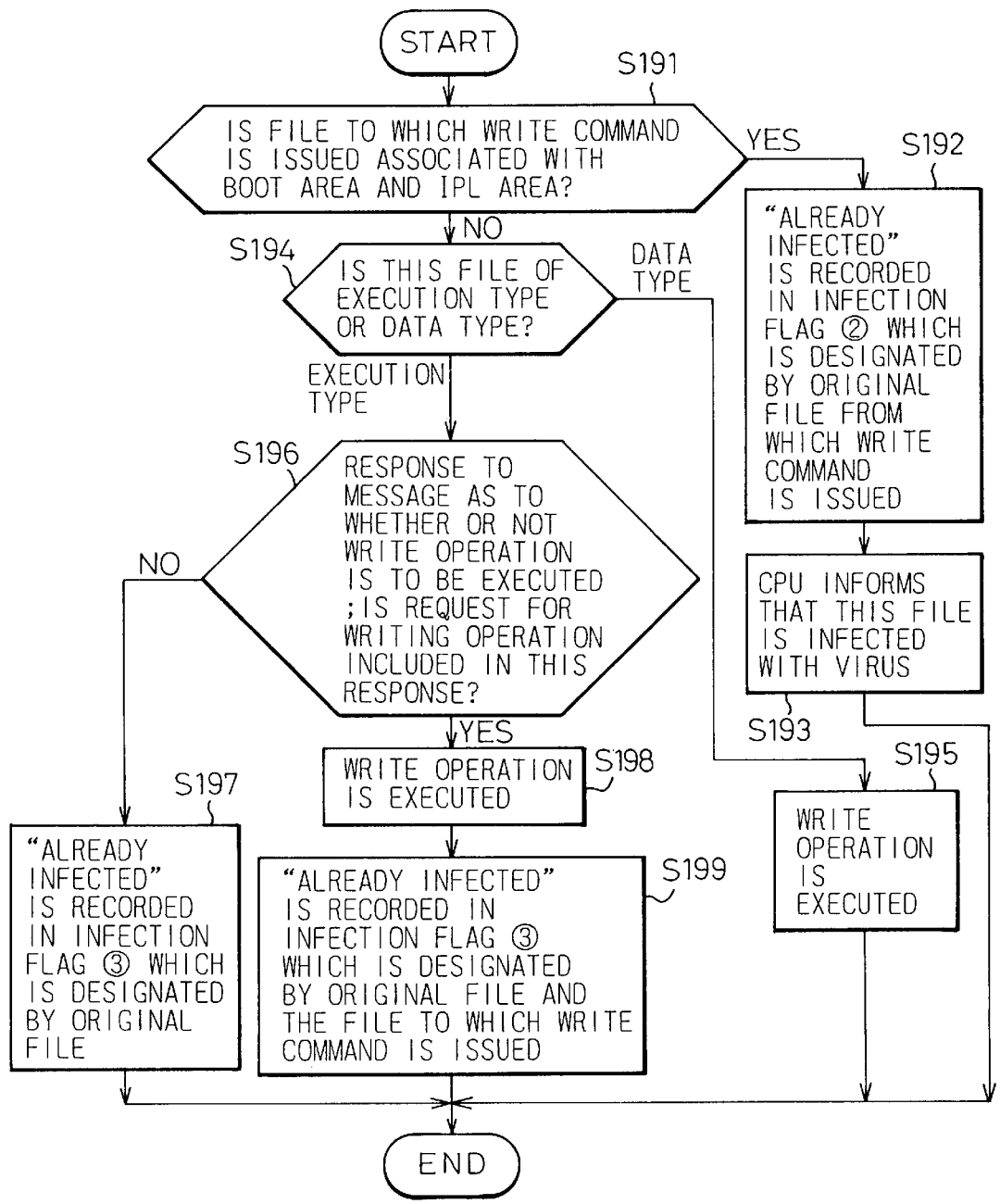
FIG. 19 is a flowchart for explaining the fifth example of a processing flow to be executed by an embodiment of the present invention.

Next, virus-infected file detection to be executed by the storage device 1 having the function of coping with a computer virus will be described. The detection falls into two procedures; a procedure to be executed using a virus checker, and a procedure to be executed by judging the attribute of a writing-destination file. FIGS. 17 and 18 describe a processing flow of virus-infected file detection to be executed using a virus checker (first half and second half of the fourth example). FIG. 19 describes a processing flow (fifth example) of virus-infected file detection to be executed by judging the attribute of a writing-destination file.

For detecting a virus-infected file using a virus checker, the storage device 1 having the function of coping with a computer virus first waits, as described in the fourth example of a processing flow shown in FIGS. 17 and 18, for the start of a period of detecting a virus-infected file. When it is judged that the detecting period starts, control is passed to step S172. Original information of a virus checker which is stored in the original information management file 34 is merged with the latest differential information brought about due to modification concerning the virus checker which is stored in the version upgrade information management file 35 in order to produce the latest virus checker. The produced virus checker is expanded in the RAM 33.

Thereafter, one of the unprocessed files on the disk 30 is extracted at step S173. At step S174, the produced virus checker is used to check if the extracted file is infected with a virus. When it is judged by the checking that a file is infected with a virus, control is passed to step S175. "1" is recorded as infection flag <1> associated with the file in the file information management file 36, whereby it is registered that the file is infected with a virus. By contrast, when it is judged that the file is not infected with a virus, control is passed to step S176. "0" is recorded as infection flag <1>, whereby it is registered that the file is not infected with a virus.

At step S177, it is judged that all the files stored on the disk 30 have been processed. If it is judged that an unprocessed file is left, control is returned to step S173. If it is judged that no unprocessed file is left, control is passed to step S178. It is judged if a mode, in which original information stored in the original information management file 34 and differential information brought about due to modification which is stored in the version upgrade information management file 35 are also subjected to virus check, is designated. If the mode in which both the original information and differential information brought about due to modification are subjected to virus check is not designated, control is returned to step S171.

By contrast, if it is judged that the mode, in which both the original information stored in the original information management file 34 and the differential information brought about due to modification which is stored in the version upgrade information management file 35 are also subjected to virus check, is designated, control is passed to step S181 described in FIG. 18. One of the original information and differential information brought about due to modification is expanded in a work area in the RAM 33. At step S182, the produced virus checker is used to check if the file expanded in the work area is infected with a virus. The virus check for original information or differential information brought about due to modification is carried out in order to deal with emergence of a new kind of virus.

If it is judged by the virus check that the file is not infected with a virus, control is passed to step S183. "0" is recorded as infection flags <4> and <5> associated with the file in the file information management file 36. It is thus registered that the file is not infected with a virus. By contrast, when it is judged that the file is infected with a virus, control is passed to step S184. "1" is recorded as infection flags <4> and <5> associated with the file in the file information management file 36. It is thus registered that the original information is infected with a virus.

At step S185, it is judged if all original information and differential information brought about due to modification have been processed. If it is judged that an unprocessed file is left, control is returned to step S181. If it is judged that no unprocessed file is left, control is returned to step S171 in FIG. 17.

As mentioned above, the storage device 1 having the function of coping with a computer virus uses a virus checker to periodically check if files stored on the disk 30, original information stored in the original information management file 34, and differential information brought about due to modification which is stored in the version upgrade information management file 35 are infected with viruses. The results of the check are registered in the form of infection flags <1>, <4>, and <5> in the file information management file 36.

In the fourth example of a processing flow shown in FIGS. 17 and 18, a virus checker is activated at intervals of a specific period. Alternatively, the system may be designed so that the virus checker is activated in response to a command issued from the personal computer 2a. Moreover, in the fourth example of a processing flow in FIGS. 17 and 18, the storage device 1 having the function of coping with a computer virus actuates a virus checker. Alternatively, the system may be designed so that the personal computer 2a actuates the virus checker.

On the other hand, for detecting a virus-infected file by judging the attribute of a writing-destination file, when a writing request for a file stored on the disk 30 is issued from the personal computer 2a (the writing request is issued by a file loaded from the disk 30 to the personal computer 2a), as described in the fifth example of a processing flow in FIG. 19, the storage device 1 having the function of coping with a computer virus first references the value of a starting portion flag in the file information management file 36 so as to judge if the writing-destination file belongs to a bootstrap or IPL.

If it is judged by the judgment at step S191 that the writing-destination file belongs to the bootstrap or IPL, control is passed to step S192. It is then judged that the file having issued the writing request is infected with a virus. "1" is recorded as infection flag <2> associated with the file in the file information management file 36, whereby it is registered that the file is infected with a virus. At step S193, it is reported to the personal computer 2a that the file which made the writing request is a file infected with a virus. The processing is then terminated without writing.

By contrast, if it is judged at step S191 that the writing-destination file does not belong to the bootstrap or IPL, control is passed to step S194. The value of an execution/data type flag in the file information management file 36 is referenced in order to judge if the writing-destination file is an executable file or data file. If it is judged that the writing-destination file is a data file, writing is executed for the file at step S195. The processing is then terminated.

By contrast, if it is judged at step S194 that the writing-destination file is an executable file, it is judged that it is highly probable that the file having issued the writing request is infected with a virus. Control is then passed to step S196. While the fact is being reported, a message asking if writing should be executed is output to the personal computer 2a. A response to the inquiry is duly received.

If it is judged at step S196 that the response from the personal computer 2a instructs that writing should not be executed, control is passed to step S197. "1" is recorded as infection flag <3> associated with the file, which has issued the writing request, in the file information management file 36, whereby it is registered that the file is infected with a virus. The processing is then terminated.

Herein, even when a file that is a source of a writing request writes itself, "1" is recorded as infection flag <3> associated with the file in the file information management file 36. This is attributable not only to the fact that it is highly probable that a file attempting to write an executable file is infected with a virus, but also to the system design of the present invention that upgrading a file into a new version is realized by registering differential information brought about due to modification in the version upgrade information management file 35 and that upgrading a file into a new version without following this procedure is illegal.

By the way, if it is judged at step S196 that a response from the personal computer 2a instructs that writing should be executed, although it is highly probable that the file that is a source of the writing request is infected with a virus, it is instructed to ignore the probability. Control is therefore passed to step S198. Writing is executed for the writing-destination file. At step S199, "1" is recorded as infection flags <3> associated with the writing-source and writing-destination files in the file information management file 36, whereby it is registered that the files are infected with a virus. The processing is then terminated.

As mentioned above, when a writing request is issued for a file stored on the disk 30, if the writing-destination file belongs to a bootstrap or IPL, or if the writing-destination file is an executable file, the storage device 1 having the function of coping with a computer virus judges that a file which is a source of the writing request is infected with a virus. The fact is registered in the form of infection flags <2> and <3> in the file information management file 36. If the writing-destination file belongs to the bootstrap or IPL, executing writing is disabled. If the writing-destination file is an executable file, it is determined through interactive processing if writing should be executed for the file. When writing is executed, it is judged that the writing-destination file will also be infected with a virus. The fact is registered in the form of infection flag <3> in the file information management file 36.

Next, processing to be executed for a virus-infected file by the storage device 1 having the function of coping with a computer virus will be described.

Figure 20:
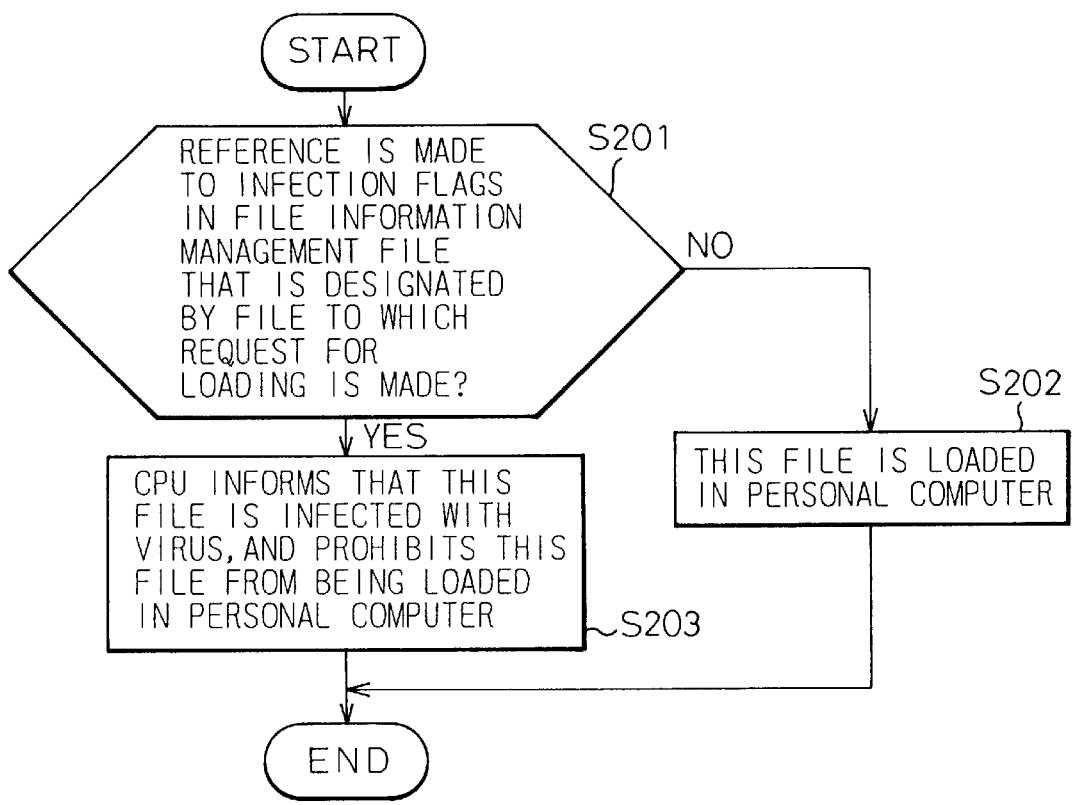
FIG. 20 is a flowchart for explaining the sixth example of a processing flow to be executed by an embodiment of the present invention.

When receiving a loading request made for a file (executable file) stored on the disk 30 from the personal computer 2a, as described in the sixth example of a processing flow in FIG. 20, the storage device 1 having the function of coping with a computer virus references infection flags <1>, <2>, and <3> in the file information management file 36 (step S201) so as to check if the file for which the loading request is made is infected with a virus. When it is judged that the file is not infected with a virus, the file is loaded into the personal computer 2a. Running the file is thus instructed (step S202). By contrast, when it is judged that the file is infected with a virus, loading the file is rejected (step S203). Running the file is thus prevented.

As mentioned above, the storage device 1 having the function of coping with a computer virus gives control so that a virus-infected file registered in the file information management file 36 will not be run. Consequently, a file that is detected to be infected with a virus by a virus checker will never be run. A file that has evaded checking by the virus checker and that is detected to be infected with a virus in terms of the attribute of a writing-destination file will not be rerun. Thus, proliferation of the virus can be reliably prevented.

In the sixth example of a processing flow in FIG. 20, running a file infected with a virus is rejected without exception. However, a program may be produced to have a pattern resembling the pattern of a virus, and a virus checker may make a mistake in checking. The system may therefore be designed so that it is determined through interaction with the personal computer 2a whether the run rejection should be lifted.

Figure 21:
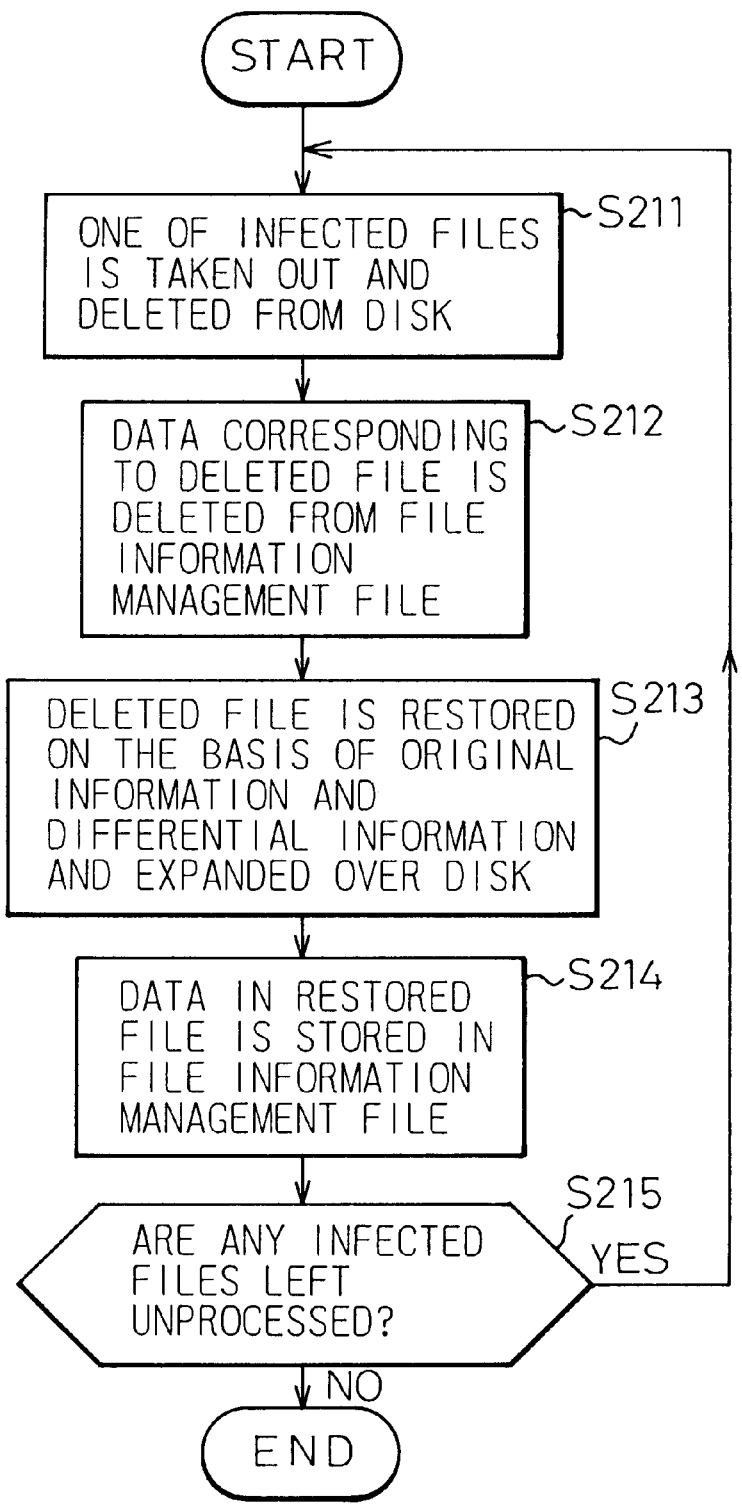
FIG. 21 is a flowchart for explaining the seventh example of a processing flow to be executed by an embodiment of the present invention.

On the other hand, when a command instructing restoration of a virus-infected file stored on the disk 30 is issued from the personal computer 2a, as described in the seventh example of a processing flow in FIG. 21, the storage device 1 having the function of coping with a computer virus first references infection flags <1>, <2>, and <3> in the file information management file 36, extracts one file infected with a virus, and deletes the file from the disk 30 at step S211. At step S212, the data of the deleted file is deleted from the file information management file 36.

At step S213, infection flag <4> in the file information management file 36 is referenced, and original information of the deleted file, which is not infected with a virus, is read from the original information management file 34. Infection flag <5> in the file information management file 36 is referenced, and the latest differential information brought about due to modification concerning the deleted file, which is not infected with a virus, is read from the original information management file 34. The original information is then merged with the differential information brought about due to modification in order to restore the deleted file. The restored file is then expanded on the disk 30. At step S214, data of the restored file is registered in the file information management file 36. At step S215, it is judged if an unprocessed virus-infected file is left. If no unprocessed file is left, the processing is terminated. If an unprocessed file is left, control is returned to step S211.

As mentioned above, the storage device 1 having the function of coping with a computer virus deletes a file infected with a virus from the disk 30. Original information of the file and differential information brought about due to modification are used to restore the infected file into an uninfected one. The file not infected with a virus is then expanded on the disk 30.

In the seventh example of a processing flow in FIG. 21, when a restoration command is issued for a virus-infected file from the personal computer 2a, restoring the virus-infected file is executed. Alternatively, the system may be designed so that restoration is executed at intervals of a specific period. Restoring the virus-infected file may thus be executed. When this system design is adopted, a file infected with a virus can be restored autonomously irrespective of the personal computer 2a. In the seventh example of a processing flow in FIG. 21, the latest differential information brought about due to modification which is not infected with a virus is used to restore a file infected with a virus into the latest one. Alternatively, the system may be designed so that differential information brought about due to modification which is identified by an instruction sent from the personal computer 2a and pointed out by history information is used for restoration.

When the seventh example of a processing flow in FIG. 21 is employed, the storage device 1 having the function of coping with a computer virus executes the processing of restoring a file infected with a virus into an uninfected file. At this time, as described in the eighth example of a processing flow in FIG. 22, the file infected with a virus and virus information concerning the file-infected file may be saved in the inexecutable area 37.

Figure 22:
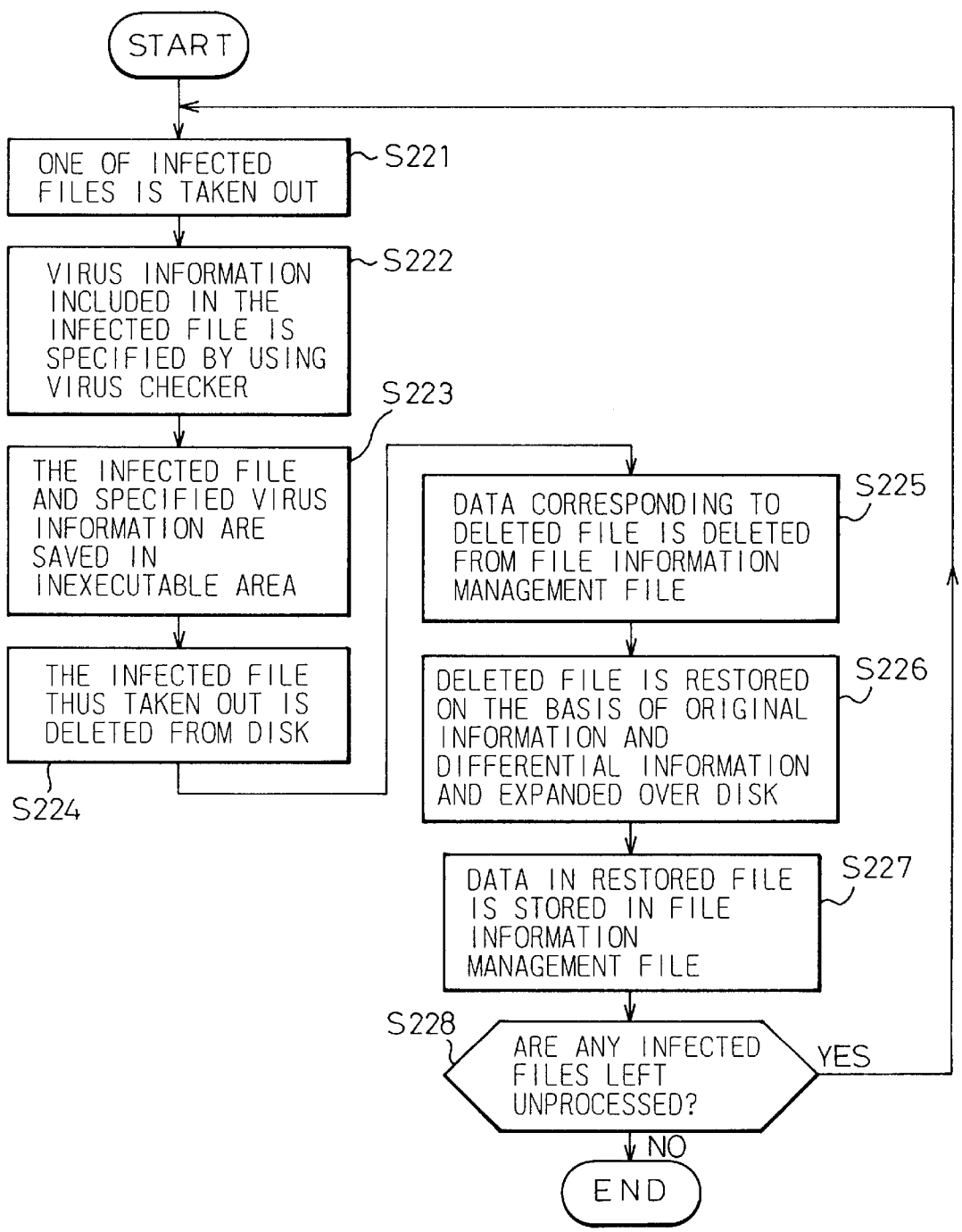
FIG. 22 is a flowchart for explaining the eighth example of a processing flow to be executed by an embodiment of the present invention.

Specifically, according to the eighth example of a processing flow in FIG. 22, when a command instructing restoration of a virus-infected file stored on the disk 30 is issued from the personal computer 2a, the storage device 1 having the function of coping with a computer virus first references infection flags <1>, <2>, and <3> in the file information management file 36 and extracts one file infected with a virus at step S221. At step S222, a virus checker expanded in advance is used to specify virus information concerning the extracted virus-infected file. At step S223, the extracted virus-infected file and virus information specified at step S223 are saved in the inexecutable area 37. At step S224, the extracted virus-infected file is deleted from the disk 30.

At step S225, data of the deleted file is deleted from the file information management file 36. At step S226, infection flag <4> in the file information management file 36 is referenced, and original information of the deleted file which is not infected with a virus is read from the original information management file 34. Infection flag <5> in the file information management file 36 is referenced, and the latest differential information brought about due to modification concerning the deleted file which is not infected with a virus is read from the original information management file 34. The original information is then merged with the differential information brought about due to modification in order to restore the deleted file. The restored file is then expanded on the disk 30. At step S227, data of the restored file is registered in the file information management file 36. At step S228, it is judged if an unprocessed virus-infected file is left. If no unprocessed file is left, the processing is terminated. If an unprocessed file is left, control is returned to step S221.

As mentioned above, the storage device 1 having the function of coping with a computer virus deletes a file infected with a virus from the disk 30, restores the file into an uninfected one that is not infected with a virus using original information and differential information brought about due to modification concerning the file, and expands the restored file on the disk 30. At this time, the file infected with a virus and virus information concerning the file are saved in the inexecutable area 37.

The virus-infected file and virus information concerning the file, which are saved in the inexecutable area 37, become very useful information for analysis of an intruding virus. However, if anybody is allowed to access this kind of useful information, there arises a fear that the information may be rewritten by mistake.

Figure 14:
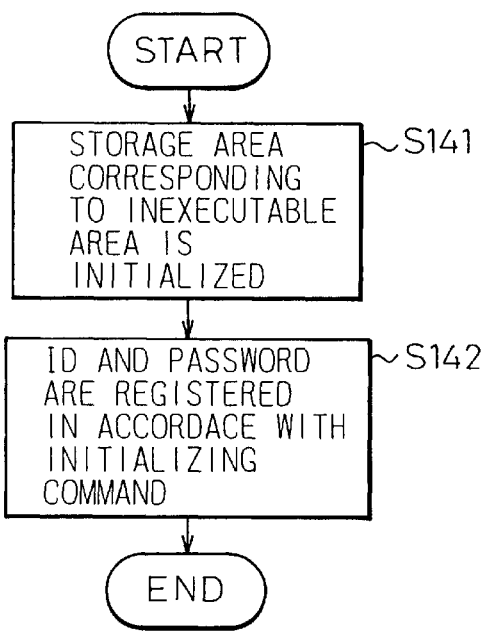
FIG. 14 is a flowchart for explaining the first example of a processing flow to be executed by an embodiment of the present invention.
Figure 23:
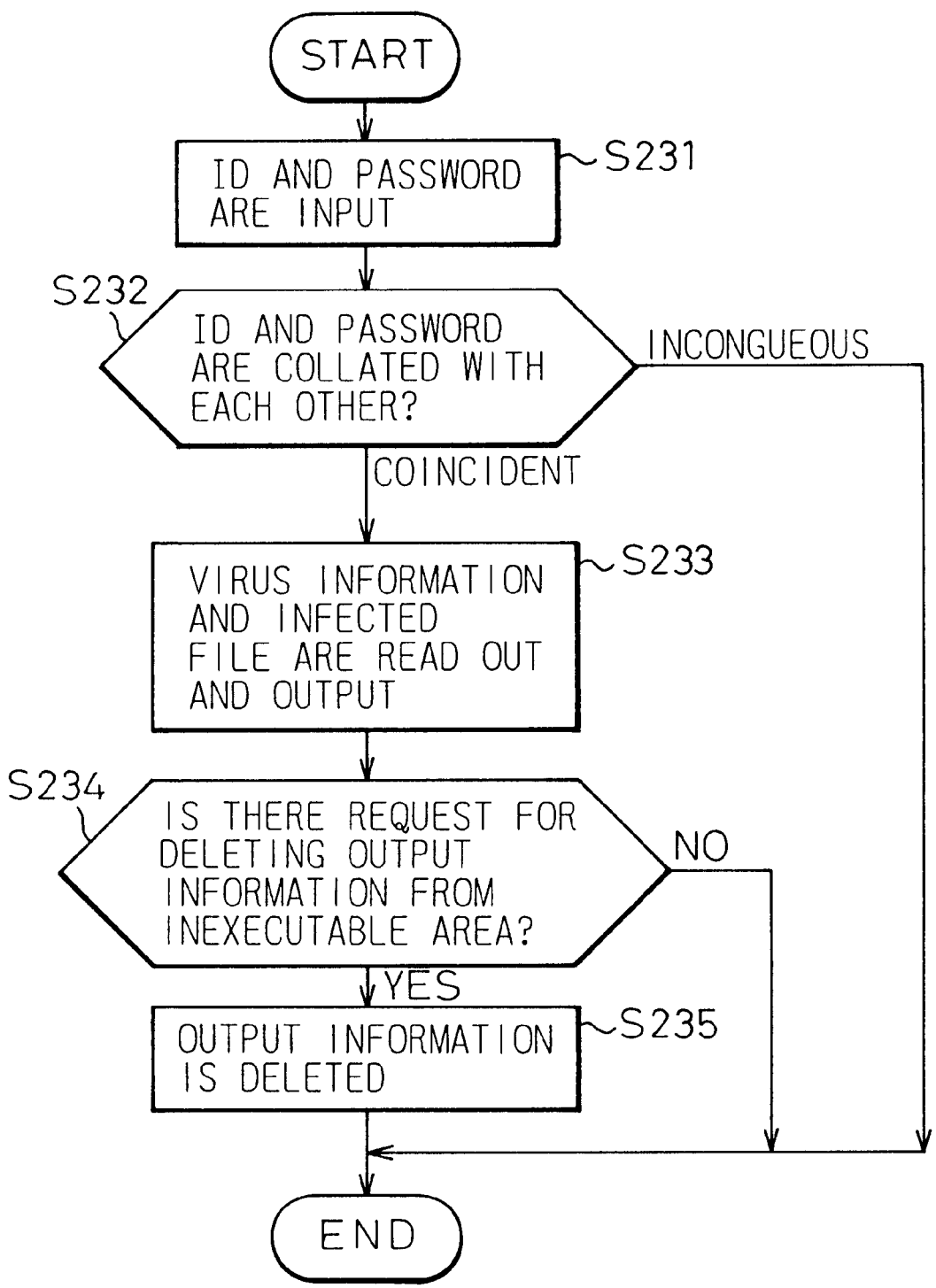
FIG. 23 is a flowchart for explaining the ninth example of a processing flow to be executed by an embodiment of the present invention.

When a command instructing reading of saved information from the inexecutable area 37 is issued from the personal computer 2a, as describe in the ninth example of a processing flow in FIG. 23, the storage device 1 having the function of coping with a computer virus first requests entry of an ID number and password which have been registered according to the processing flow (first example) described in FIG. 14 (step S231), and collates the ID number and password entered in response to the request with those registered according to the processing flow in FIG. 14 to see if they agree with each other (step S232). Under the condition that they agree with each other, a virus-infected file and virus information which are saved in the inexecutable area 37 are read and output to the personal computer 2a (step S233). When a deletion request is issued for the extracted virus-infected file and virus information from the personal computer 2a (step S234), deletion is executed (step S235).

As mentioned above, the storage device 1 having the function of coping with a computer virus reads a virus-infected file and virus information, which are saved in the inexecutable area 37, under the condition that an ID number and password agree with internal data.

In the ninth example of a processing flow in FIG. 23, when a Read command is issued for the inexecutable area 37 from the personal computer 2a, saved information is read from the inexecutable area 37. Alternatively, the system may be designed so that the saved information is read from the inexecutable area 37 by executing reading at intervals of a specific period. For further improving security, an encoding mechanism for converting a virus-infected file and virus information, which are saved in the inexecutable area 37, into encoded data may be prepared. The encoded data produced by the encoding mechanism is then stored in the inexecutable area 37. In addition, a decoding mechanism for executing inverse conversion that is inverse to the conversion performed by the encoding mechanism may be prepared. In this case, the virus-infected file and virus information which are saved in the inexecutable area 37 are read using the decoding mechanism.

FIGS. 24 to 30 are block diagrams for explaining several examples (first to seventh examples) of an anti-virus operation performed in the basic embodiment shown in FIG. 2.

Figure 24:
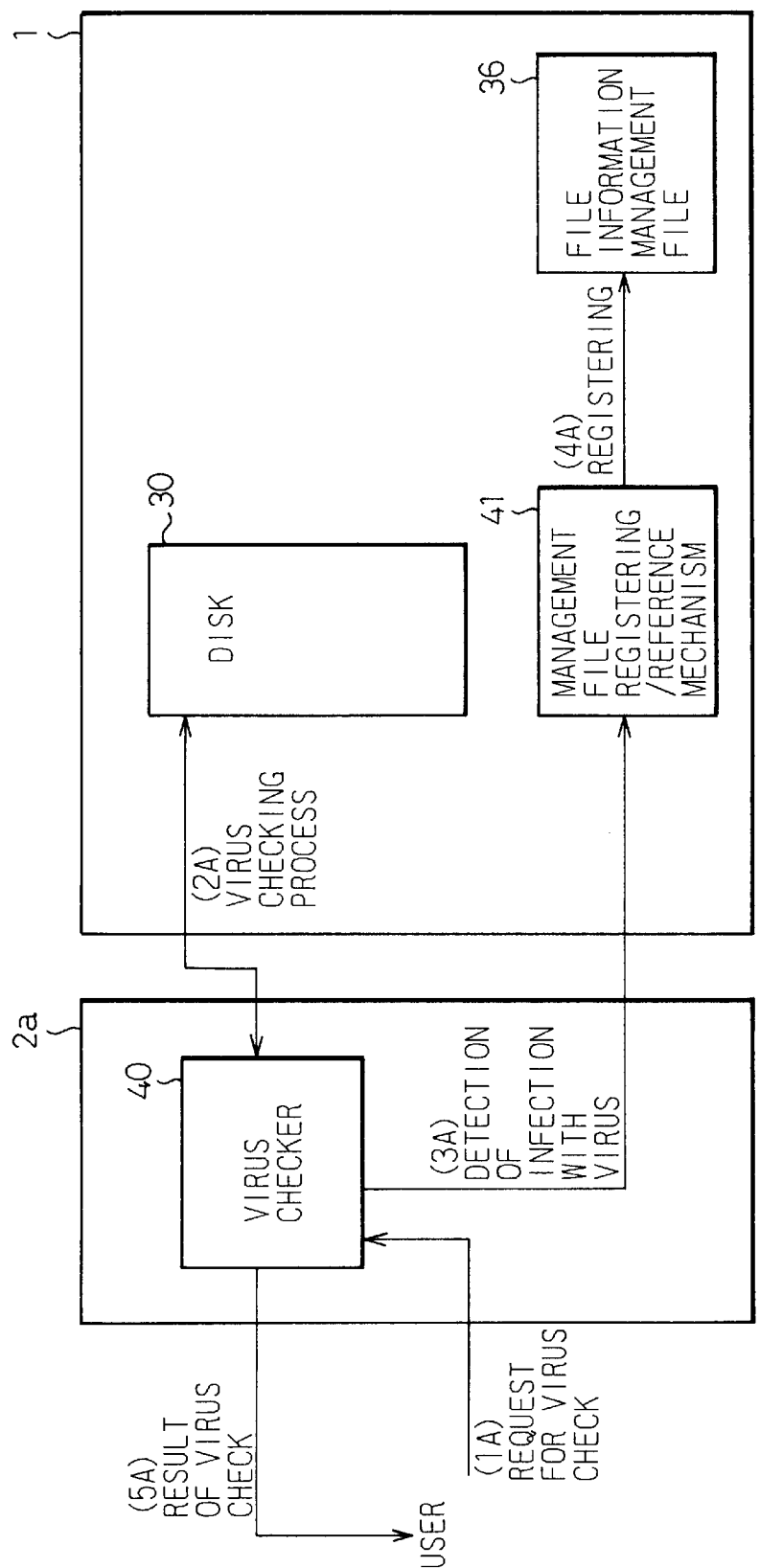
FIG. 24 is a block diagram for explaining the first example of an anti-virus operation in the embodiment shown in FIG. 2.
Figure 25:
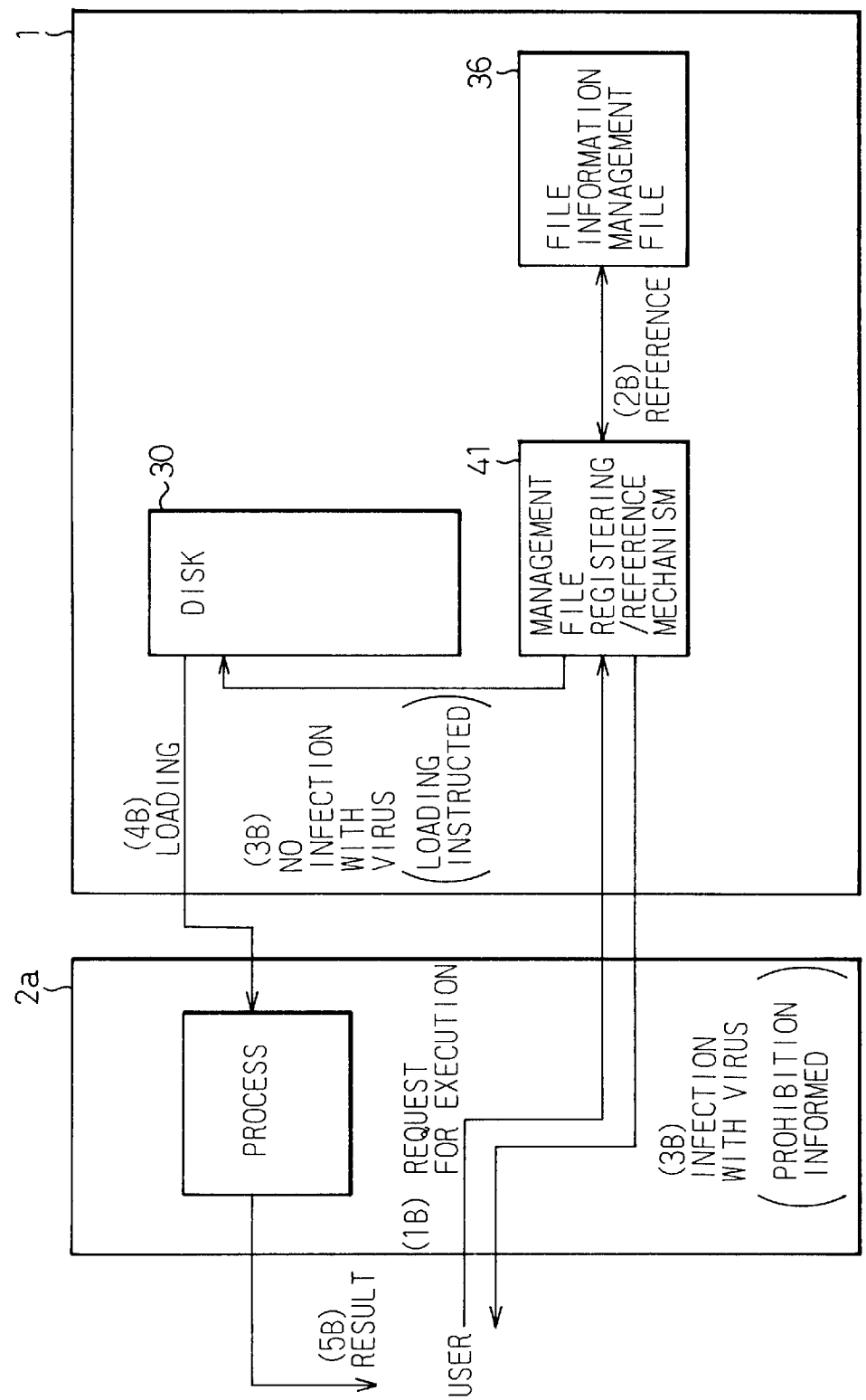
FIG. 25 is a block diagram for explaining the second example of the anti-virus operation in the embodiment shown in FIG. 2.

In the storage device 1 having the function of coping with a computer virus in accordance with the present invention shown in FIG. 2, as shown in FIG. 24 for explaining the first example of an anti-virus operation, a virus checker 40 (which may be run by the personal computer 2a or storage device 1 having the function of coping with a computer virus) checks if a file expanded on the disk 30 is infected with a virus. The result of the checking is received and registered in the file information management file 36. Thus, the file information management file 36 is used to manage the information indicating if files expanded on the disk 30 are infected with viruses. Furthermore, as shown in FIG. 25 for explaining the second example of an anti-virus operation, when a use request is made for a file expanded on the disk 30 via the personal computer 2a, the file information management file 36 is referenced to judge if the file for which the use request is made is infected with a virus. If the file is infected with a virus, the use of the file is prohibited. Thus, proliferation of the virus is prevented.

In FIGS. 24 and 25, reference numeral 41 denotes a management file registering/referencing mechanism for registering data in the file information management file 36 and referencing the file information management file 36 for data. When the system is designed so that the virus checker 40 is run by the storage device 1 having the function of coping with a computer virus, checking on an infection with a virus can be executed concurrently with an operation of the personal computer 2a. Moreover, checking on an infection with a virus can be executed at night or the like. In case the virus checker 40 is run by the personal computer 2a, the virus checker 40 may not be loaded from the storage device 1 having the function of coping with a computer virus but may be prepared separately. Alphanumeric characters in parentheses (1A) to (5A) in FIG. 24 and (1B) to (3B), (3B)', (4B), and (5B) in FIG. 25 denote processing orders.

Figure 26:
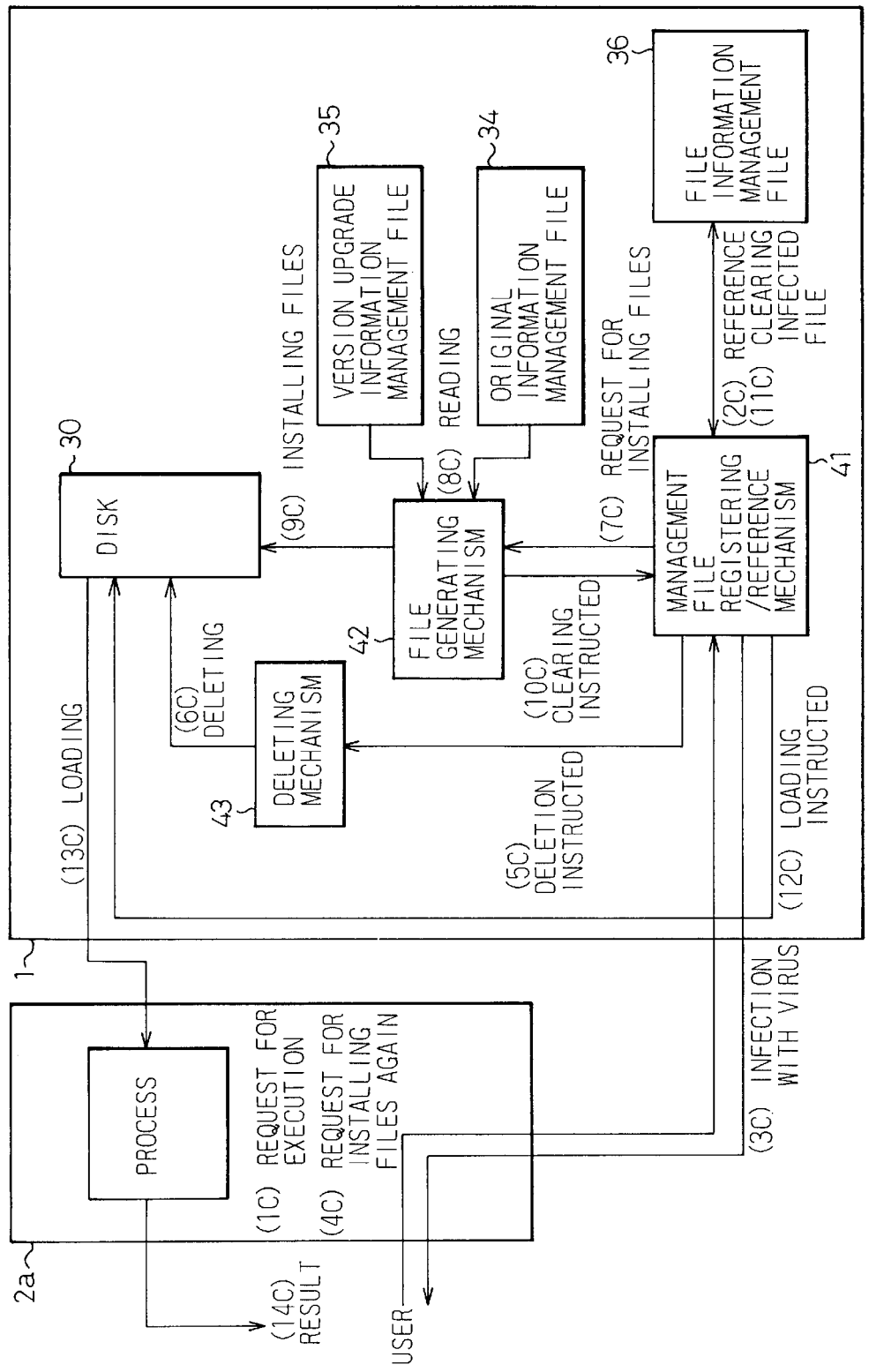
FIG. 26 is a block diagram for explaining the third example of the anti-virus operation in the embodiment shown in FIG. 2.

The storage device 1 having the function of coping with a computer virus in accordance with the present invention, which has the configuration shown in FIG. 2, includes, as shown in FIG. 26 for explaining the third example of an anti-virus operation, an original information management file 34 for encoding and managing original information of files, a version upgrade information management file 35 for encoding and managing differential information brought about due to modification concerning the files, a file generating mechanism 42 for decoding and merging encoded data of original information and differential information brought about due to modification so as to generate a file, and a deleting mechanism 43 for deleting a file from the disk 30. When it is judged that a file for which a use request is made is infected with a virus, the deleting mechanism 43 is used to delete the virus-infected file from the disk 30. The file generating mechanism 42 is used to restore the virus-infected file into an uninfected one that is not infected with a virus and expand the file on the disk 30. The system can therefore be operated by performing a minimum scale of installation. In the drawing, alphanumeric characters in parentheses (1C) to (14C) denote processing orders.

Figure 27:
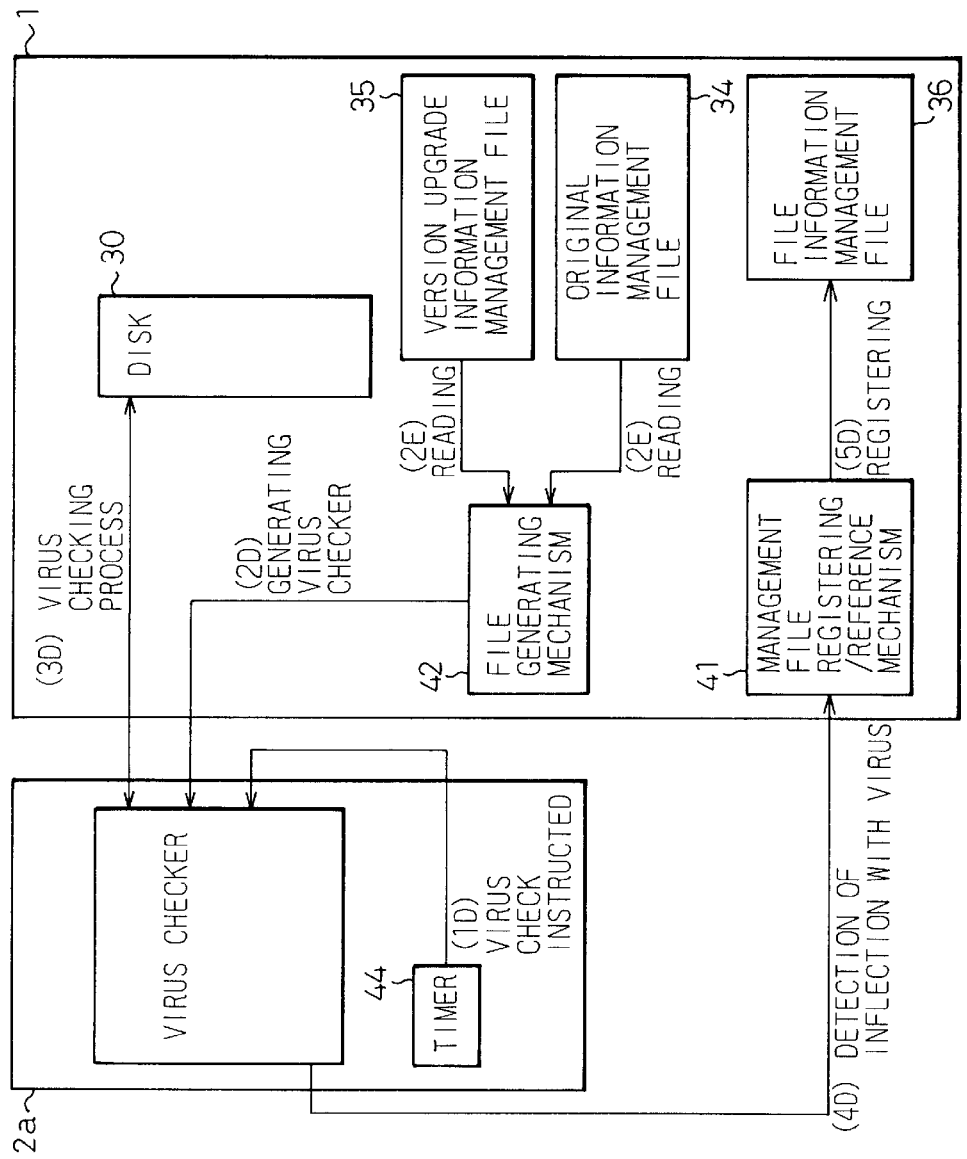
FIG. 27 is a block diagram for explaining the fourth example of the anti-virus operation in the embodiment shown in FIG. 2.
Figure 28:
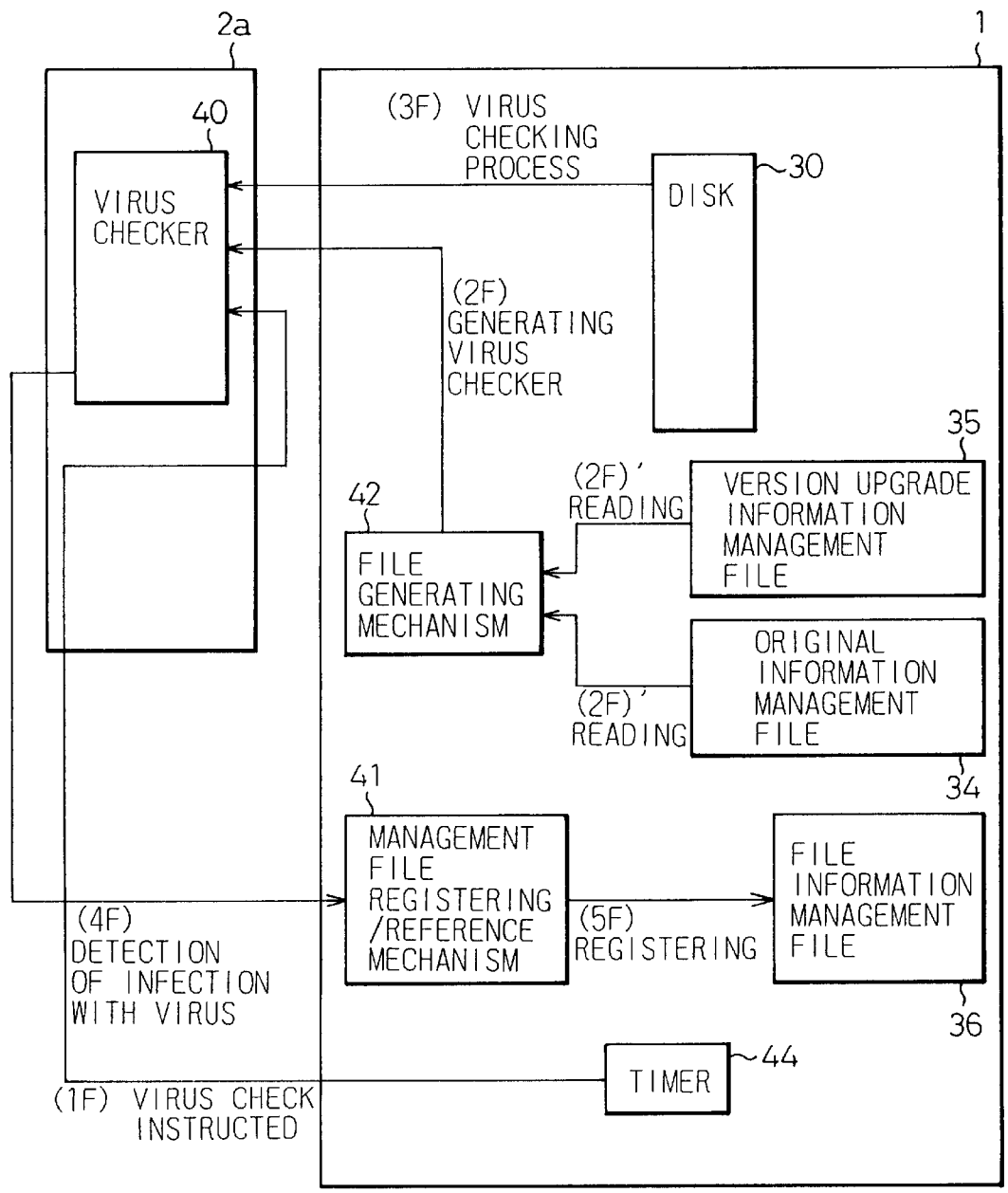
FIG. 28 is a block diagram for explaining the fifth example of the anti-virus operation in the embodiment shown in FIG. 2.

Moreover, the storage device 1 having the function of coping with a computer virus in accordance with the present invention, which has the configuration shown in FIG. 2, includes, as shown in FIG. 27 for explaining the fourth example of an anti-virus operation, a timer 44 for issuing a virus check instruction periodically (which may be incorporated in the personal computer 2a as shown in FIG. 28 for explaining the fifth example of an anti-virus operation). Furthermore, encoded data of original information of the virus checker 40 is stored in the original information management file 34. Encoded data of differential information brought about due to modification concerning the virus checker 40 is stored in the version upgrade information management file 35. When the timer 44 issues an instruction for a virus check, the file generating mechanism 42 generates the virus checker 40. The thus-generated virus checker 40 (that may be run by the personal computer 2a or storage device 1 having the function of coping with a computer virus) checks if a file expanded on the disk is infected with a virus. The result of the checking is registered in the file information management file 36. Thus, the virus checker 40 is protected from being infected with a virus, and intrusion of the virus is prevented. Alphanumeric characters in parentheses (1D) to (3D), (3E), (4D), and (5D) in FIG. 27 and (1F), (2F), (2F)', (3F) to (5F) in FIG. 28 denote processing orders.

Figure 29:
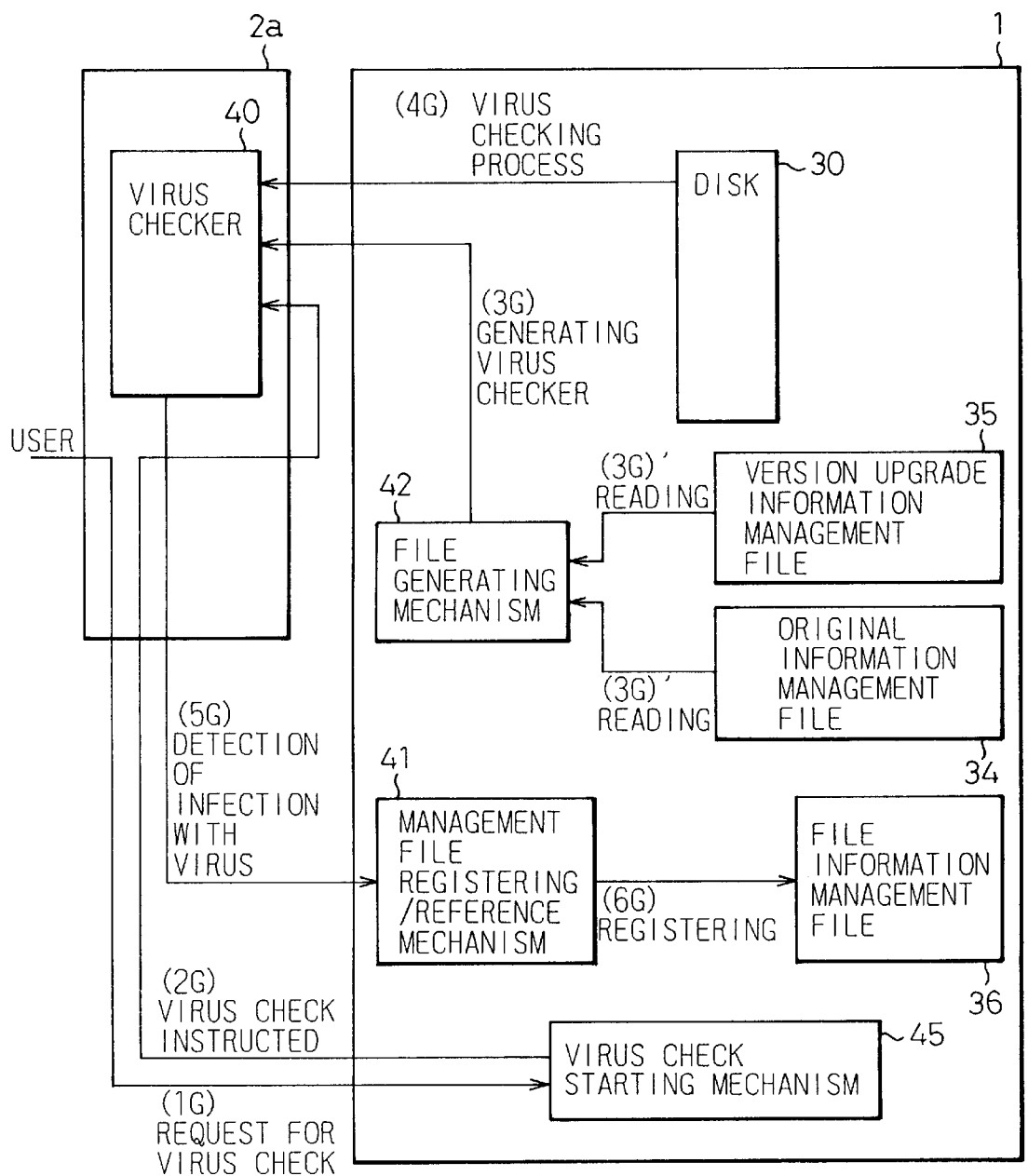
FIG. 29 is a block diagram for explaining the sixth example of the anti-virus operation in the embodiment shown in FIG. 2.

The storage device 1 having the function of coping with a computer virus in accordance with the present invention, which has the configuration shown in FIG. 2, includes, as shown in FIG. 29 for explaining the sixth example of an anti-virus operation, a virus check starting mechanism 45 for issuing an instruction of virus check in response to an instruction sent from the personal computer 2a. Furthermore, encoded data of original information of the virus checker 40 is stored in the original information management file 34. Encoded data of differential information brought about due to modification concerning the virus checker 40 is stored in the version upgrade information management file 35. When the virus check starting mechanism 45 issues an instruction of virus check, the file generating mechanism 42 generates the virus checker 40. The thus-generated virus checker 40 (that may be run by the personal computer 2a or storage device 1 having the function of coping with a computer virus) checks if a file expanded on the disk 30 is infected with a virus. The result of the checking is registered in the file information management file 36. Thus, the virus checker 40 is protected from being infected with a virus, and intrusion of the virus is prevented. Alphanumeric characters (1G) to (3G), (3G)', (4G) to (6G) in the drawing denote processing orders.

Figure 30:
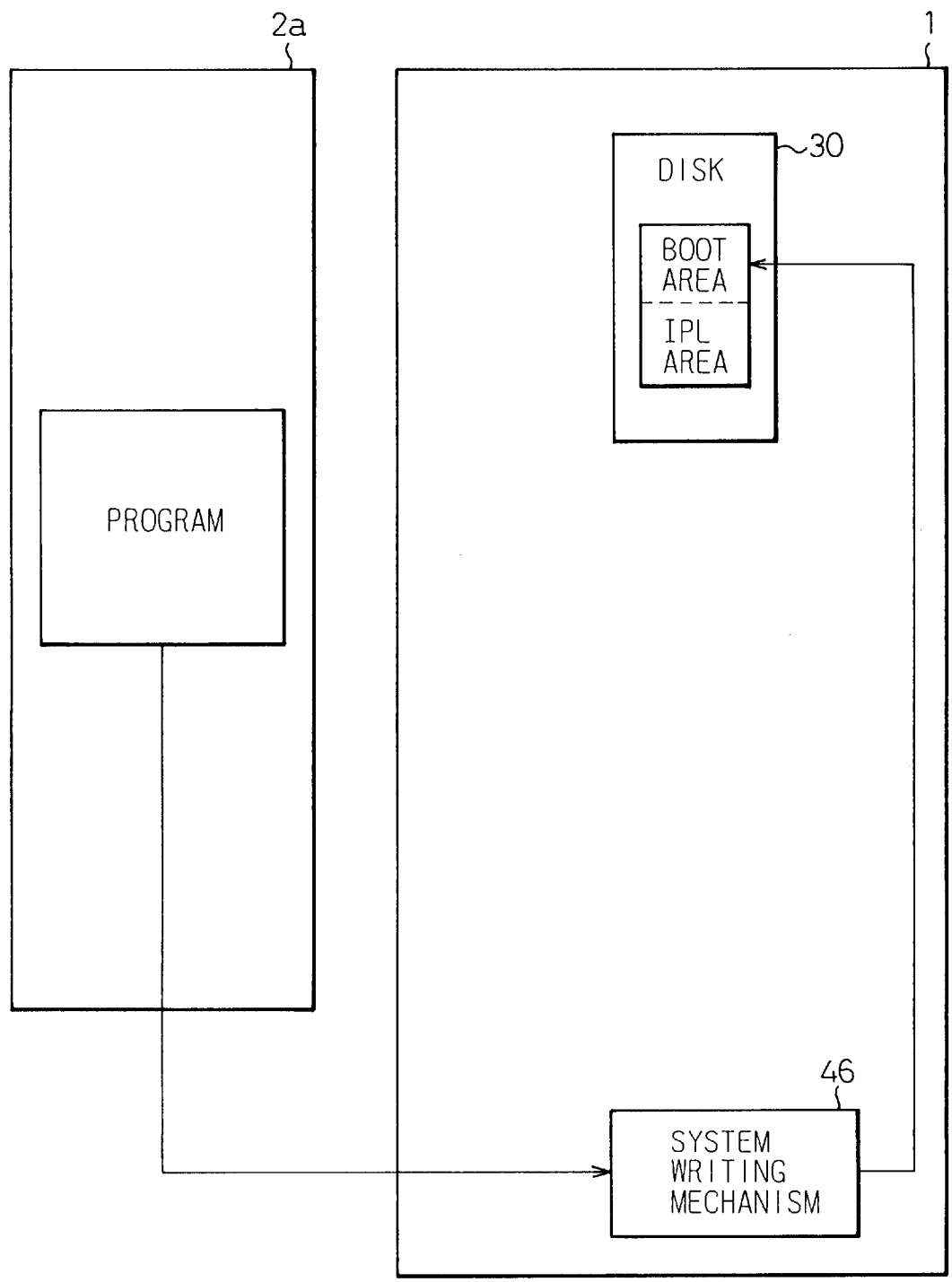
FIG. 30 is a block diagram for explaining the seventh example of the anti-virus operation in the embodiment shown in FIG. 2.

Moreover, the storage device 1 having the function of coping with a computer virus in accordance with the present invention, which has the configuration shown in FIG. 2, includes, as shown in FIG. 30 for explaining the seventh example of an anti-virus operation, a dedicated system writing mechanism 46 for writing a bootstrap or IPL on the disk 30. When the system writing mechanism 46 is used to run a program, writing the bootstrap or IPL on the disk 30 is permitted. This is intended to guarantee normal writing as an exception to the rule that a file attempting to write the bootstrap or IPL on the disk 30 is judged to be infected with a virus and that executing the file is prohibited.

In the aforesaid examples shown in FIGS. 24 to 30, a file infected with a virus is detected by the virus checker 40. In addition, a file attempting to write a bootstrap or IPL or an executable file is judged to be infected with a virus. Aside from this, if the criteria described below are added, infection with a virus can be prevented more reliably. That is to say, when the size of a file is varied by running the file, the file stored on the disk 30 is judged to be infected with a virus (for example, judged periodically). Although a file stored on the disk 30 is judged to be an executable file in terms of the fine name, if the file is declared to be a data file in the file information management file 36, the file stored on the disk 30 is judged to be infected with a virus (for example, judged at the start of processing). Although a file is stored on the disk 30, if original information is not registered in the original information management file 36 and differential information brought about due to modification is not registered in the version upgrade information management file 37, the file stored on the disk 30 is judged to be infected with a virus (judged periodically or at the time of access to the file).

Checking if the size of a file is varied by running the file is achieved by, for example, merging original information managed in the original information management file 34 with differential information brought about due to modification which is managed in the version upgrade information management file 35 in order to produce a file, and by comparing the size of the produced file with the size of the file stored on the disk 30.

As described so far, in several preferred embodiments of a storage device 1 having the function of coping with a computer virus in accordance with the present invention, infection with a virus is prevented actively. The use of a file infected with a virus is prohibited, and the file is restored automatically. Furthermore, information concerning infection with viruses is preserved so that it cannot be accessed readily. Consequently, a storage device capable of properly dealing with infection with a virus can be constructed.

We claim:

1. A storage device, having the function of coping with a computer virus, which has the ability to deal with infection of a file stored on a disk with a virus, comprising:

an infection management table unit for registering virus infected files which are stored on said disk;

a virus checker for detecting if a file stored on said disk is infected with a virus, wherein the virus checker is activated at intervals of a specific period or in response to a command instruction;

a table registering unit for registering a result of detection from said virus checker in said infection management table unit;

a judging unit for judging if a file is infected with a virus in response to an external use request externally made for a file stored on said disk by referencing said infection management table unit; and a prohibiting unit for prohibiting use of the externally requested file when said judging unit judges that the externally requested file is infected with a virus.

2. A storage device having the function of coping with a computer virus according to claim 1, wherein said virus checker is designed to be run by said storage device having the function of coping with a computer virus.

3. A storage device having the function of coping with a computer virus according to claim 2, wherein said virus checker is designed to be activated at intervals of a specific period.

4. A storage device having the function of coping with a computer virus according to claim 2, wherein said virus checker is designed to be activated in response to a command instruction.

5. A storage device having the function of coping with a computer virus according to claim 2, wherein when a writing request is issued for a system startup area stored on said disk, said table registering unit judges that a file which is stored on said disk and is a source of the writing request is infected with a virus, and registers the fact in said infection management table unit.

6. A storage device having the function of coping with a computer virus according to claim 5, further comprising an invalidating unit that when a writing request is issued for a system startup area stored on said disk, invalidates the writing request.

7. A storage device having the function of coping with a computer virus according to claim 5, further comprising a determining unit for determining through interactive processing whether the use of a virus-infected file that is registered in said infection management table unit should be permitted, wherein said prohibiting unit does not prohibit the use of a file which is permitted by said determining unit.

8. A storage device having the function of coping with a computer virus according to claim 5, further comprising a first managing unit for managing original information of files stored on said disk, a second managing unit for managing differential information brought about due to modification concerning the files stored on said disk and history information concerning the differential information brought about due to modification, and a file registering unit for merging original information of a file managed by said first managing unit with differential information brought about due to modification concerning the file which is managed by said second managing unit so as to produce a file, and for registering the produced file on said disk.

9. A storage device having the function of coping with a computer virus according to claim 5, further comprising a saving unit for saving a virus-infected file that is registered in said infection management table unit and virus information concerning the file in an inexecutable area, and a reading unit for reading information saved in said inexecutable area under the condition that permission information for permitting access to said inexecutable area is given.

10. A storage device having the function of coping with a computer virus according to claim 2, when a writing request is issued for an executable file stored on said disk, said table registering unit judges that a file which is stored on said disk and is a source of the writing request is infected with a virus, and registers the fact in said infection management table unit.

11. A storage device having the function of coping with a computer virus according to claim 2, wherein when the size of a file is varied by running the file, said table registering unit judges that the file, said table registering unit judges that the file stored on said disk is infected with a virus, and registers the fact in said infection management table unit.

12. A storage device having the function of coping with a computer virus according to claim 2, wherein although a file stored on said disk is judged to be an executable file in terms of the file name, if the file is declared to be a data file, said table registering unit judges that the file stored on said disk is infected with a virus, and registers the fact in said infection management table unit.

13. A storage device having the function of coping with a computer virus according to claim 2, further comprising a determining unit for determining through interactive processing whether the use of a virus-infected file that is registered in said infection management table unit should be permitted, wherein said prohibiting unit does not prohibit the use of a file which is permitted by said determining unit.

14. A storage device having the function of coping with a computer virus according to claim 25, further comprising an invalidating unit that when a writing request is issued for a system startup area stored on said disk, invalidates the writing request.

15. A storage device having the function of coping with a computer virus according to claim 14, further comprising a dedicated writing unit for executing writing for a system startup area stored on said disk, wherein when a writing request is issued for the system startup area stored on said disk, if the writing request specifies the use of said writing unit, said invalidating unit does not invalidate the writing request.

16. A storage device having the function of coping with a computer virus according to claim 2, further comprising a first managing unit for managing original information of files stored on said disk, a second managing unit for managing differential information brought about due to modification concerning the files stored on said disk and history information concerning said differential information brought about due to modification, and file registering unit for merging the original information of a file managed by said first managing unit with the differential information brought about due to modification concerning the file which is managed by said second managing unit so as to produce a file, and for registering the produced file on said disk.

17. A storage device having the function of coping with a computer virus according to claim 2, further comprising a saving unit for saving a virus-infected file that is registered in said infection management table unit and virus information concerning the file in an inexecutable area, and a reading unit for reading information saved in said inexecutable area under the condition that permission information for permitting access to said inexecutable area is given.

18. A storage device having the function of coping with a computer virus according to claim 26, further comprising a permitting unit for determining through interactive processing whether a writing request made for a file, which is registered as a virus-infected file by said table registering unit and is running, should be permitted.

19. A storage device having the function of coping with a computer virus according to claim 18, wherein when a writing request is permitted by said permitting unit, if a file that is a destination of the writing request is rewritten, said table registering unit judges that the file which is stored on said disk and is the destination of the writing request is infected with a virus and registers the fact in said infection management table unit.

20. A storage device having the function of coping with a computer virus according to claim 18, further comprising a determining unit for determining through interactive processing whether the use of a virus-infected file that is registered in said infection management table unit should be permitted, wherein said prohibiting unit does not prohibit the use of a file which is permitted by said determining unit.

21. A storage device having the function of coping with a computer virus according to claim 18, further comprising a first managing unit for managing original information of files stored on said disk, a second managing unit for managing differential information brought about due to modification concerning the files stored on said disk and history information concerning the differential information brought about due to modification, and a file registering unit for merging original information of a file managed by said first managing unit with differential information brought about due to modification concerning the file which is managed by said second managing unit so as to produce a file, and for registering the produced file on said disk.

22. A storage device having the function of coping with a computer virus according to claim 18, further comprising a saving unit for saving a virus-infected file that is registered in said infection management table unit and virus information concerning the file in an inexecutable area, and a reading unit for reading information saved in said inexecutable area under the condition that permission information for permitting access to said inexecutable area is given.

23. A storage device having the function of coping with a computer virus according to claim 1, wherein said virus checker is designed to be activated at intervals of a specific period.

24. A storage device having the function of coping with a computer virus according to claim 1, wherein said virus checker is designed to be activated in response to a command instruction.

25. A storage device having the function of coping with a computer virus according to claim 1, wherein when a writing request is issued for a system startup area stored on said disk, said table registering unit judges that a file which is stored on said disk and is a source of the writing request is infected with a virus, and registers the fact in said infection management table unit.

26. A storage device having the function of coping with a computer virus according to claim 1, wherein when a writing request is issued for an executable file stored on said disk, said table registering unit judges that a file which is stored on said disk and is a source of the writing request is infected with a virus, and registers the fact in said infection management table unit.

27. A storage device having the function of coping with a computer virus according to claim 1, wherein when the size of a file is varied by running the file, said table registering unit judges that the file stored on said disk is infected with a virus, and registers the fact in said infection management table unit.

28. A storage device having the function of coping with a computer virus according to claim 1, wherein although a file stored on said disk is judged to be an declared to be a data file, said table registering unit judges that the file stored on said disk is infected with a virus, and registers the fact in said infection management table unit.

29. A storage device having the function of coping with a computer virus according to claim 1, further comprising a determining unit for determining through interactive processing whether the use of a virus-infected file that is registered in said infection management table unit should be permitted, wherein said prohibiting unit does not prohibit the use of a file which is permitted by said determining unit.

30. A storage device having the function of coping with a computer virus according to claim 1, further comprising:
   a first managing unit for managing original information of files stored on said disk;
   a second managing unit for managing differential information brought about modification concerning the files stored on said disk and history information concerning said differential information brought about due to modification; and
   a file registering unit for merging the original information of a file managed by said first managing unit with the differential information brought about due to modification concerning the file which is managed by said second managing unit so as to produce a file, and for registering the produced file on said disk,
   wherein said first managing unit manages original information that is confirmed not to be infected with a virus by said virus checker, and said second managing unit manages differential information brought about due to modification which is confirmed not to be infected with a virus by said virus checker.

31. A storage device having the function of coping with a computer virus according to claim 1, further comprising:
   a first managing unit for managing original information of files stored on said disk;
   a second managing unit for managing differential information brought about modification concerning the files stored on said disk and history information concerning said differential information brought about due to modification; and
   a file registering unit for merging the original information of a file managed by said first managing unit with the differential information brought about due to modification concerning the file which is managed by said second managing unit so as to produce a file, and for registering the produced file on said disk, wherein as for a file which is stored on said disk, of which original information is not registered in said first managing unit, and of which differential information brought about due to modification is not registered in said second managing unit, said table registering unit judges that the file stored on said disk is infected with a virus and registers the fact in said infection management table unit.

32. A storage device having the function of coping with a computer virus according to claim 1, further comprising:

a first managing unit for managing original information of files stored on said disk;

a second managing unit for managing differential information brought about modification concerning the files stored on said disk and history information concerning said differential information brought about due to modification; and a file registering unit for merging the original information of a file managed by said first managing unit with the differential information brought about due to modification concerning the file which is managed by said second managing unit so as to produce a file, and for registering the produced file on said disk, wherein said first managing unit manages original information of said virus checker, and said second managing unit manages differential information brought about due to modification concerning said virus checker and history information concerning the differential information brought about due to modification.

33. A storage device having the function of coping with a computer virus according to claim 32, wherein said generating unit generates said virus checker at the time of running said virus checker.

34. A storage device having the function of coping with a computer virus according to claim 1, further comprising:

a first managing unit for managing original information of files stored on said disk;

a second managing unit for managing differential information brought about modification concerning the files stored on said disk and history information concerning said differential information brought about due to modification; and a file registering unit for merging the original information of a file managed by said first managing unit with the differential information brought about due to modification concerning the file which is managed by said second managing unit so as to produce a file, and for registering the produced file on said disk, wherein said first managing unit encodes and manages original information, and said second managing unit encodes and manages differential information brought about due to modification, further comprising a decoding unit for decoding encoded data managed by said first and second managing unit, and an encoding unit for executing inverse conversion that is inverse to conversion performed by said decoding unit.

35. A storage device having the function of coping with a computer virus according to claim 1, further comprising:

a first managing unit for managing original information of files stored on said disk;

a second managing unit for managing differential information brought about modification concerning the files stored on said disk and history information concerning said differential information brought about due to modification;

a file registering unit for merging the original information of a file managed by said first managing unit with the differential information brought about due to modification concerning the file which is managed by said second managing unit so as to produce a file, and for registering the produced file on said disk; and a saving unit for saving a virus-infected file that is registered in said infection management table unit and virus information concerning the file in an executable area, and a reading unit for reading information saved in said inexecutable area under the condition that permission information for permitting access to said inexecutable area is given.

36. A storage device having the function of coping with a computer virus according to claim 1, further comprising:

a first managing unit for managing original information of files stored on said disk;

a second managing unit for managing differential information brought about modification concerning the files stored on said disk and history information concerning said differential information brought about due to modification;

a file registering unit for merging the original information of a file managed by said first managing unit with the differential information brought about due to modification concerning the file which is managed by said second managing unit so as to produce a file, and for registering the produced file on said disk; and a restoring unit for deleting a virus-infected file, which is registered in said infection management table unit, from said disk, activating said file registering unit, thus restoring the file, and then registering the restored file on said disk, wherein said first managing unit encodes and manages original information, and said second managing unit encodes and manages original information, and said second managing unit encodes and manages differential information brought about due to modification, further comprising a decoding unit for decoding encoded data managed by said first and second managing units, and an encoding unit for executing inverse conversion that is inverse to conversion performed by said decoding unit.

37. A storage device having the function of coping with a computer virus according to claim 1, further comprising:

a first managing unit for managing original information of files stored on said disk;

a second managing unit for managing differential information brought about modification concerning the files stored on said disk and history information concerning said differential information brought about due to modification;

a file registering unit for merging the original information of a file managed by said first managing unit with the differential information brought about due to modification concerning the file which is managed by said second managing unit so as to produce a file, and for registering the produced file on said disk;

a restoring unit for deleting a virus-infected file, which is registered in said infection management table unit, from said disk, activating said file registering unit, thus restoring the file, and then registering the restored file on said disk; and a saving unit for saving a virus-infected file that is registered in said infection management table unit and virus information concerning the file in an inexecutable area, and a reading unit for reading information saved in said inexecutable area under the condition that permission information for permitting access to said inexecutable area is given.

38. A storage device, having the function of coping with a computer virus, which has the ability to deal with infection of a file stored on a disk with a virus, comprising:

an infection management table unit used to manage files stored on said disk to see if the files are infected with viruses;

a table registering unit for receiving a result of detection from a virus checker for detecting if a file stored on said disk is infected with a virus, and for registering the result in said infection management table unit;

a judging unit that, when a use request is made externally for a file stored on said disk, references said infection management table unit so as to judge if the file is infected with a virus;

a prohibiting unit that, when said judging unit judges that a file is infected with a virus, prohibits the use of the file, wherein when a writing request is issued for a system startup area stored on said disk, said table registering unit judges that a file which is stored on said disk and is a source of the writing request is infected with a virus, and registers the fact in said infection management table unit; and a file registering unit for merging original information of a file managed by a first managing unit with differential information brought about due to modification concerning a file which is managed by a second managing unit so as to produce a produced file, and for registering the produced file on said disk.

39. A storage device, having the function of coping with a computer virus, which has the ability to deal with infection of a file stored on a disk with a virus, comprising:

an infection management table unit used to manage files stored on said disk to see if the files are infected with viruses;

a table registering unit for receiving a result of detection from a virus checker for detecting if a file stored on said disk is infected with a virus, and for registering the result in said infection management table unit;

a judging unit that, when a use request is made externally for a file stored on said disk, references said infection management table unit so as to judge if the file is infected with a virus;

a prohibiting unit that, when said judging unit judges that a file is infected with a virus, prohibits the use of the file;

a saving unit for saving a virus-infected table unit and virus information concerning the file in an inexecutable area;

a reading unit for reading information saved in said inexecutable area under the condition that permission information for permitting access to said inexecutable area is given; and a file registering unit for merging original information of a file managed by a first managing unit with differential information brought about due to modification concerning a file which is managed by a second managing unit so as to produce a produced file, and for registering the produced file on said disk.

40. A storage device, having the function of coping with a computer virus, which has the ability to deal with infection of a file stored on a disk with a virus, comprising:

an infection management table unit used to manage files stored on said disk to see if the files are infected with viruses;

a table registering unit for receiving a result of detection from a virus checker for detecting if a file stored on said disk is infected with a virus, and for registering the result in said infection management table unit;

a judging unit that, when a use request is made externally for a file stored on said disk, references said infection management table unit so as to judge if the file is infected with a virus;

a prohibiting unit that, when said judging unit judges that a file is infected with a virus, prohibits the use of the file;

a first managing unit for managing original information of files stored on said disk;

a second managing unit for managing differential information brought about modification concerning the files stored on said disk and history information concerning said differential information brought about due to modification;

a file registering unit for merging the original information of a file managed by said first managing unit with the differential information brought about due to modification concerning the file which is managed by said second managing unit so as to produce a produced file, and for registering the produced file on said disk;

a restoring unit for deleting a virus-infected file, which is registered in said infection management table unit, from said disk, activating said file registering unit, thus restoring the file, and then registering the restored file on said disk.

41. A storage device, having the function of coping with a computer virus, which has the ability to deal with infection of a file stored on a disk with a virus, comprising:

an infection management table unit used to manage files stored on said disk to see if the files are infected with viruses;

a table registering unit for internally receiving a result of detection from a virus checker which internally detects that a file stored on said disk is infected with a virus, and for registering the result in said infection management table unit;

a judging unit that, when a use request is made externally for a file stored on said disk, references said infection management table unit so as to judge if the file is infected with a virus;

a prohibiting unit that, when said judging unit judges that a file is infected with a virus, prohibits the use of the file; and a file registering unit for merging original information of a file managed by a first managing unit with differential information brought about due to modification concerning a file which is managed by a second managing unit so as to produce a produced file, and for registering the produced file on said disk.

42. A method of storing a computer program on a computer storage device, having the function of coping with a computer virus, which has the ability to deal with infection of a file stored on a disk with a virus, comprising the steps of:

managing files stored on said disk to see if the files are infected with viruses;

receiving a result of detection from a virus checker for detecting if a file stored on said disk is infected with a virus;

registering the result of detection;

referencing said infection management table unit so as to judge if the file is infected with a virus when a use request is made externally for a file stored on said disk;

prohibiting the use of the file when judging that a file is infected with a virus;

judging that a stored file on said disk is a source of the use request infected with a virus and registering when the use request is issued for a system startup area stored on said disks;

merging original information of a file managed by a first managing unit with differential information brought about due to modification concerning a file which is managed by a second managing unit so as to produce a produced file; and registering the produced file on said disk.

43. A method of storing a computer program on a computer storage device, having the function of coping with a computer virus, which has the ability to deal with infection of a file stored on a disk with a virus, comprising the steps of:

managing files stored on said disk to see if the files are infected with viruses;

receiving a result of detection from a virus checker for detecting if a file stored on said disk is infected with a virus;

registering the result of detection;

judging if the file is infected with a virus when a use request is made externally for a file stored on said disk;

prohibiting use of the infected file when judging that a file is infected with a virus;

saving a virus-infected table and virus information concerning the file in an inexecutable area;

reading information saved in said inexecutable area under the condition that permission information for permitting access to said inexecutable area is given;

merging original information of a file managed by a first managing unit with differential information brought about due to modification concerning a file which is managed by a second managing unit so as to produce a produced file; and registering the produced file on said disk.

44. A method of storing a computer program on a computer storage device, having the function of coping with a computer virus, which has the ability to deal with infection of a file stored on a disk with a virus, comprising the steps of:

managing files stored on said disk to see if the files are infected with viruses;

receiving a result of detection from a virus checker for detecting if a file stored on said disk is infected with a virus;

registering the result of detection;

judging if the file is infected with a virus when a use request is made externally for a file stored on said disk;

prohibiting the use of the file when judging that a file is infected with a virus;

managing original information of files stored on said disk;

managing differential information brought about by modification concerning the files stored on said disk and history information concerning said differential information brought about due to the modification;

merging the original information of a file managed by said first managing unit with the differential information brought about due to modification concerning the file which is managed by said second managing unit so as to produce a produced file;

registering the produced file on said disk;

deleting a registered virus-infected file from said disk, thus restoring the file; and registering the restored file on said disk.

45. A storage device, having the function of coping with a computer virus, which has the ability to deal with infection of a file stored on a disk with a virus, comprising:

an infection management table unit for registering virus infected files which are stored on said disk;

a virus checker for detecting if a file stored on said disk is infected with a virus, wherein the virus checker is activated at intervals of a specific period or in response to a command instruction;

a table registering unit for registering a result of detection from said virus checker in said infection management table unit;

a judging unit for judging if a file is infected with a virus in response to an external use request externally made for a file stored on said disk by referencing said infection management table unit;

a prohibiting unit for prohibiting use of the externally requested file when said judging unit judges that the externally requested file is infected with a virus.

a first managing unit for managing original information of files stored on said disk;

a second managing unit for managing differential information brought about modification concerning the files stored on said disk and history information concerning said differential information brought about due to modification; and a file registering unit for merging the original information of a file managed by said first managing unit with the differential information brought about due to modification concerning the file which is managed by said second managing unit so as to produce a file, and for registering the produced file on said disk, wherein said first managing unit manages original information that is confirmed not to be infected with a virus by said virus checker, and said second managing unit manages differential information brought about due to modification which is confirmed not to be infected with a virus by said virus checker.

46. A storage device, having the function of coping with a computer virus, which has the ability to deal with infection of a file stored on a disk with a virus, comprising:

an infection management table unit for registering virus infected files which are stored on said disk;

a virus checker for detecting if a file stored on said disk is infected with a virus, wherein the virus checker is activated at intervals of a specific period or in response to a command instruction;

a table registering unit for registering a result of detection from said virus checker in said infection management table unit;

a judging unit for judging if a file is infected with a virus in response to an external use request externally made for a file stored on said disk by referencing said infection management table unit;

a prohibiting unit for prohibiting use of the externally requested file when said judging unit judges that the externally requested file is infected with a virus;

a first managing unit for managing original information of files stored on said disk;

a second managing unit for managing differential information brought about modification concerning the files stored on said disk and history information concerning said differential information brought about due to modification; and a file registering unit for merging the original information of a file managed by said first managing unit with the differential information brought about due to modification concerning the file which is managed by said second managing unit so as to produce a file, and for registering the produced file on said disk, wherein as for a file which is stored on said disk, of which original information is not registered in said first managing unit, and of which differential information brought about due to modification is not registered in said second managing unit, said table registering unit judges that the file stored on said disk is infected with a virus and registers the fact in said infection management table unit.

47. A storage device, having the function of coping with a computer virus, which has the ability to deal with infection of a file stored on a disk with a virus, comprising:

an infection management table unit for registering virus infected files which are stored on said disk;

a virus checker for detecting if a file stored on said disk is infected with a virus, wherein the virus checker is activated at intervals of a specific period or in response to a command instruction;

a table registering unit for registering a result of detection from said virus checker in said infection management table unit;

a judging unit for judging if a file is infected with a virus in response to an external use request externally made for a file stored on said disk by referencing said infection management table unit;

a prohibiting unit for prohibiting use of the externally requested file when said judging unit judges that the externally requested file is infected with a virus;

a first managing unit for managing original information of files stored on said disk;

a second managing unit for managing differential information brought about modification concerning the files stored on said disk and history information concerning said differential information brought about due to modification; and a file registering unit for merging the original information of a file managed by said first managing unit with the differential information brought about due to modification concerning the file which is managed by said second managing unit so as to produce a file, and for registering the produced file on said disk, wherein said first managing unit manages original information of said virus checker, and said second managing unit manages differential information brought about due to modification concerning said virus checker and history information concerning the differential information brought about due to modification.

48. A storage device, having the function of coping with a computer virus, which has the ability to deal with infection of a file stored on a disk with a virus, comprising:

an infection management table unit for registering virus infected files which are stored on said disk;

a virus checker for detecting if a file stored on said disk is infected with a virus, wherein the virus checker is activated at intervals of a specific period or in response to a command instruction;

a table registering unit for registering a result of detection from said virus checker in said infection management table unit;

a judging unit for judging if a file is infected with a virus in response to an external use request externally made for a file stored on said disk by referencing said infection management table unit;

a prohibiting unit for prohibiting use of the externally requested file when said judging unit judges that the externally requested file is infected with a virus;

a first managing unit for managing original information of files stored on said disk;

a second managing unit for managing differential information brought about modification concerning the files stored on said disk and history information concerning said differential information brought about due to modification; and a file registering unit for merging the original information of a file managed by said first managing unit with the differential information brought about due to modification concerning the file which is managed by said second managing unit so as to produce a file, and for registering the produced file on said disk, wherein said first managing unit encodes and manages original information, and said second managing unit encodes and manages differential information brought about due to modification, further comprising a decoding unit for decoding encoded data managed by said first and second managing unit, and an encoding unit for executing inverse conversion that is inverse to conversion performed by said decoding unit.

49. A storage device, having the function of coping with a computer virus, which has the ability to deal with infection of a file stored on a disk with a virus, comprising:

an infection management table unit for registering virus infected files which are stored on said disk;

a virus checker for detecting if a file stored on said disk is infected with a virus, wherein the virus checker is activated at intervals of a specific period or in response to a command instruction;

a table registering unit for registering a result of detection from said virus checker in said infection management table unit;

a judging unit for judging if a file is infected with a virus in response to an external use request externally made for a file stored on said disk by referencing said infection management table unit;

a prohibiting unit for prohibiting use of the externally requested file when said judging unit judges that the externally requested file is infected with a virus;

a first managing unit for managing original information of files stored on said disk;

a second managing unit for managing differential information brought about modification concerning the files stored on said disk and history information concerning said differential information brought about due to modification;

a file registering unit for merging the original information of a file managed by said first managing unit with the differential information brought about due to modification concerning the file which is managed by said second managing unit so as to produce a file, and for registering the produced file on said disk; and a saving unit for saving a virus-infected file that is registered in said infection management table unit and virus information concerning the file in an executable area, and a reading unit for reading information saved in said inexecutable area under the condition that permission information for permitting access to said inexecutable area is given.

50. A storage device, having the function of coping with a computer virus, which has the ability to deal with infection of a file stored on a disk with a virus, comprising:

an infection management table unit for registering virus infected files which are stored on said disk;

a virus checker for detecting if a file stored on said disk is infected with a virus, wherein the virus checker is activated at intervals of a specific period or in response to a command instruction;

a table registering unit for registering a result of detection from said virus checker in said infection management table unit;

a judging unit for judging if a file is infected with a virus in response to an external use request externally made for a file stored on said disk by referencing said infection management table unit;

a prohibiting unit for prohibiting use of the externally requested file when said judging unit judges that the externally requested file is infected with a virus;

a first managing unit for managing original information of files stored on said disk;

a second managing unit for managing differential information brought about modification concerning the files stored on said disk and history information concerning said differential information brought about due to modification;

a file registering unit for merging the original information of a file managed by said first managing unit with the differential information brought about due to modification concerning the file which is managed by said second managing unit so as to produce a file, and for registering the produced file on said disk;

a restoring unit for deleting a virus-infected file, which is registered in said infection management table unit, from said disk, activating said file registering unit, thus restoring the file, and then registering the restored file on said disk, wherein said first managing unit encodes and manages original information, and said second managing unit encodes and manages original information, and said second managing unit encodes and manages differential information brought about due to modification, further comprising a decoding unit for decoding encoded data managed by said first and second managing unit, and an encoding unit for executing inverse conversion that is inverse to conversion performed by said decoding unit.

51. A storage device, having the function of coping with a computer virus, which has the ability to deal with infection of a file stored on a disk with a virus, comprising:

an infection management table unit for registering virus infected files which are stored on said disk;

a virus checker for detecting if a file stored on said disk is infected with a virus, wherein the virus checker is activated at intervals of a specific period or in response to a command instruction;

a table registering unit for registering a result of detection from said virus checker in said infection management table unit;

a judging unit for judging if a file is infected with a virus in response to an external use request externally made for a file stored on said disk by referencing said infection management table unit;

a prohibiting unit for prohibiting use of the externally requested file when said judging unit judges that the externally requested file is infected with a virus;

a first managing unit for managing original information of files stored on said disk;

a second managing unit for managing differential information brought about modification concerning the files stored on said disk and history information concerning said differential information brought about due to modification;

a file registering unit for merging the original information of a file managed by said first managing unit with the differential information brought about due to modification concerning the file which is managed by said second managing unit so as to produce a file, and for registering the produced file on said disk;

a restoring unit for deleting a virus-infected file, which is registered in said infection management table unit, from said disk, activating said file registering unit, thus restoring the file, and then registering the restored file on said disk; and a saving unit for saving a virus-infected file that is registered in said infection management table unit and virus information concerning the file in an inexecutable area, and a reading unit for reading information saved in said inexecutable area under the condition that permission information for permitting access to said inexecutable area is given.

* * * * *

UNITED STATES PATENT AND TRADEMARK OFFICE
CERTIFICATE OF CORRECTION

PATENT NO. : 5,918,008
DATED : June 29, 1999
INVENTOR(S) : Yoshifusa TOGAWA et al.

It is certified that error appears in the above-identified patent and that said Letters Patent is hereby corrected as shown below:

Col. 32, line 31, change "." to --;--.

Signed and Sealed this

Twenty-first Day of December, 1999

Attest:

Q. TODD DICKINSON

*Attesting Officer*   *Acting Commissioner of Patents and Trademarks*